(12) United States Patent
Garrod et al.

(10) Patent No.: US 9,275,069 B1
(45) Date of Patent: *Mar. 1, 2016

(54) MANAGING DISCONNECTED INVESTIGATIONS

(71) Applicant: Palantir Technologies, Inc., Palo Alto, CA (US)

(72) Inventors: John Kenneth Garrod, Palo Alto, CA (US); Jacob Scott, Berkeley, CA (US); Carl Freeland, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,232

(22) Filed: Jul. 17, 2014

Related U.S. Application Data

(63) Continuation of application No. 13/747,170, filed on Jan. 22, 2013, now Pat. No. 8,812,444, which is a continuation of application No. 12/831,383, filed on Jul. 7, 2010, now Pat. No. 8,364,642.

(51) Int. Cl.
*G06F 17/30* (2006.01)

(52) U.S. Cl.
CPC .................. *G06F 17/30174* (2013.01)

(58) Field of Classification Search
CPC ................... G06F 17/30174; G06F 17/30227; G06F 17/30374
USPC ........................................................ 707/648
See application file for complete search history.

(56) References Cited

U.S. PATENT DOCUMENTS

| | | |
|---|---|---|
| 5,826,021 A | 10/1998 | Mastors et al. |
| 5,832,218 A | 11/1998 | Gibbs et al. |
| 5,878,434 A | 3/1999 | Draper et al. |
| 5,897,636 A | 4/1999 | Kaeser |
| 5,966,706 A | 10/1999 | Biliris et al. |

(Continued)

FOREIGN PATENT DOCUMENTS

| | | |
|---|---|---|
| EP | 2778913 | 9/2014 |
| GB | 2366498 | 3/2002 |

(Continued)

OTHER PUBLICATIONS

Canadian Intellectual Property Office, "Office Action", in application No. 2,677,464 dated Jan. 16, 2013, 4 pages.

(Continued)

*Primary Examiner* — Jorge A Casanova
(74) *Attorney, Agent, or Firm* — Hickman Palermo Becker Bingham LLP

(57) ABSTRACT

A system and method enable an information analyst to use a stand-alone computer-based investigation application to conduct a disconnected investigation on shared database data in a remote location where network access to a shared data repository of the system might be only periodically available, unreliable, or non-existent. In addition, the system and method enable the disconnected investigation to incrementally incorporate ongoing updates made to the shared repository of data, and to periodically publish interim or final results of the disconnected investigation to the shared data repository. A disconnected investigation can be conducted entirely at the disconnected investigation location without having any network connectivity to the shared repository of data.

20 Claims, 16 Drawing Sheets

(56) References Cited

U.S. PATENT DOCUMENTS

| | | | |
|---|---|---|---|
| 6,006,242 A | 12/1999 | Poole et al. |
| 6,134,582 A | 10/2000 | Kennedy |
| 6,243,717 B1 | 6/2001 | Gordon et al. |
| 6,463,404 B1 | 10/2002 | Appleby |
| 6,519,627 B1 | 2/2003 | Dan et al. |
| 6,523,019 B1 | 2/2003 | Borthwick |
| 7,058,648 B1 | 6/2006 | Lightfoot et al. |
| 7,089,541 B2 | 8/2006 | Ungar |
| 7,403,942 B1 | 7/2008 | Bayliss |
| 7,440,978 B2 | 10/2008 | Chan et al. |
| 7,461,158 B2 | 12/2008 | Rider et al. |
| 7,627,489 B1 | 12/2009 | Schaeffer et al. |
| 7,775,220 B2 | 8/2010 | Goddard |
| 7,912,842 B1 | 3/2011 | Bayliss |
| 7,962,495 B2 | 6/2011 | Jain et al. |
| 8,117,022 B2 | 2/2012 | Linker |
| 8,126,848 B2 | 2/2012 | Wagner |
| 8,302,855 B2 | 11/2012 | Ma et al. |
| 8,364,642 B1 | 1/2013 | Garrod |
| 8,429,527 B1 | 4/2013 | Arbogast |
| 8,554,719 B2 | 10/2013 | McGrew |
| 8,601,326 B1 | 12/2013 | Kirn |
| 2002/0035590 A1 | 3/2002 | Eibach et al. |
| 2002/0095360 A1 | 7/2002 | Joao |
| 2002/0103705 A1 | 8/2002 | Brady |
| 2003/0093401 A1 | 5/2003 | Czajkowski et al. |
| 2003/0105759 A1 | 6/2003 | Bess et al. |
| 2003/0115481 A1 | 6/2003 | Baird et al. |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1 | 5/2004 | Travis et al. |
| 2004/0153451 A1 | 8/2004 | Phillips et al. |
| 2004/0210763 A1 | 10/2004 | Jonas |
| 2005/0010472 A1 | 1/2005 | Quatse et al. |
| 2005/0097441 A1 | 5/2005 | Herbach et al. |
| 2005/0131935 A1 | 6/2005 | O'Leary et al. |
| 2005/0262493 A1 | 11/2005 | Schmidt et al. |
| 2005/0262512 A1 | 11/2005 | Schmidt et al. |
| 2006/0010130 A1 | 1/2006 | Leff et al. |
| 2006/0080316 A1 | 4/2006 | Gilmore et al. |
| 2006/0143075 A1 | 6/2006 | Carr et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2007/0000999 A1 | 1/2007 | Kubo et al. |
| 2007/0067285 A1 | 3/2007 | Blume |
| 2007/0178501 A1 | 8/2007 | Rabinowitz et al. |
| 2007/0233756 A1 | 10/2007 | D'Souza et al. |
| 2007/0271317 A1 | 11/2007 | Carmel |
| 2007/0284433 A1 | 12/2007 | Domenica et al. |
| 2007/0299697 A1 | 12/2007 | Friedlander |
| 2008/0005063 A1 | 1/2008 | Seeds |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0195672 A1 | 8/2008 | Hamel et al. |
| 2008/0228467 A1 | 9/2008 | Womack et al. |
| 2008/0270316 A1 | 10/2008 | Guidotti et al. |
| 2008/0281580 A1 | 11/2008 | Zabokritski |
| 2008/0313132 A1 | 12/2008 | Hao et al. |
| 2009/0055487 A1 | 2/2009 | Moraes et al. |
| 2009/0106178 A1 | 4/2009 | Chu |
| 2009/0112745 A1 | 4/2009 | Stefanescu |
| 2009/0164387 A1 | 6/2009 | Armstrong et al. |
| 2009/0187546 A1 | 7/2009 | Whyte |
| 2009/0271343 A1 | 10/2009 | Vaiciulis et al. |
| 2009/0299830 A1 | 12/2009 | West et al. |
| 2009/0313311 A1 | 12/2009 | Hoffmann et al. |
| 2010/0057622 A1 | 3/2010 | Faith et al. |
| 2010/0070531 A1 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0145909 A1 | 6/2010 | Ngo |
| 2010/0204983 A1 | 8/2010 | Chung et al. |
| 2010/0306285 A1 | 12/2010 | Shah et al. |
| 2011/0208822 A1 | 8/2011 | Rathod |
| 2011/0258216 A1 | 10/2011 | Supakkul et al. |
| 2012/0078595 A1 | 3/2012 | Balandin et al. |
| 2012/0136804 A1 | 5/2012 | Lucia |
| 2012/0191446 A1 | 7/2012 | Binsztok et al. |
| 2013/0124193 A1 | 5/2013 | Holmberg |
| 2013/0132348 A1 | 5/2013 | Garrod |
| 2013/0151453 A1 | 6/2013 | Bhanot et al. |
| 2013/0226944 A1 | 8/2013 | Baid et al. |
| 2014/0006404 A1 | 1/2014 | McGrew et al. |
| 2014/0108074 A1 | 4/2014 | Miller et al. |

FOREIGN PATENT DOCUMENTS

| | | |
|---|---|---|
| WO | WO2009/051987 | 4/2009 |
| WO | WO2010/030919 | 3/2010 |

OTHER PUBLICATIONS

Current Claims in Canadian application No. 2,677,464, dated Jan. 2013, 9 pages.

European Patent Office, "Search Report" in application No. 13170952.9—1958, dated Jan. 21, 2014, 6 pages.

Current Claims in application No. 13170952.9—1958, dated Jan. 2014, 6 pages.

U.S. Appl. No. 12/831,383, filed Jul. 7, 2010, Notice of Allowance, mailing date Oct. 5, 2012.

U.S. Appl. No. 12/709,462, filed Feb. 21, 2007, Final Office Action, mailing date Dec. 4, 2012.

U.S. Appl. No. 13/747,170, filed Jan. 22, 2013, Notice of Allowance, mailing date Apr. 4, 2014.

"A Real-World Problem of Matching Records," Nov. 2006, <http://grupoweb.upf.es/bd-web/slides/ullman.pdf> pp. 1-16.

"A Tour of Pinboard," <http://pinboard.in/tour> as printed May 15, 2014 in 6 pages.

Delicious, <http://delicious.com/> as printed May 15, 2014 in 1 page.

Gu et al., "Record Linkage: Current Practice and Future Directions," Jan. 15, 2004, pp. 32.

Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Nadeau et al., "A Survey of Named Entity Recognition and Classification," Jan. 15, 2004, pp. 20.

Nin et al., "On the Use of Semantic Blocking Techniques for Data Cleansing and Integration," 11th International Database Engineering and Applications Symposium, 2007, pp. 9.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Sekine et al., "Definition, Dictionaries and Tagger for Extended Named Entity Hierarchy," May 2004, pp. 1977-1980.

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

"E-MailRelay," <http://web.archive.org/web/20080821175021/http://emailrelay.sourceforge.net/> Aug. 21, 2008, pp. 2.

(56) References Cited

OTHER PUBLICATIONS

Hua et al., "A Multi-attribute Data Structure with Parallel Bloom Filters for Network Services".
Johnson, Maggie "Introduction to YACC and Bison".
Official Communication for New Zealand Patent Application No. 622389 dated Mar. 20, 2014.
Official Communication for New Zealand Patent Application No. 622404 dated Mar. 20, 2014.
Extended European Search Report for European Patent Application No. 14158958.0 dated Jun. 3, 2014.
Extended European Search Report for European Patent Application No. 14158977.0 dated Jun. 10, 2014.
European Search Report for European Patent Application No. 09813700.3 dated Apr. 3, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Mar. 27, 2014.
Official Communication for New Zealand Patent Application No. 622473 dated Jun. 19, 2014.

FIG. 5

| operation | obj_comp_id | obj_id | logical_clk | deleted | <values> |
|---|---|---|---|---|---|
| Create | 10 | 10 | 1 | 0 | Type:Person |
| Create | 101 | 10 | 1 | 0 | Name:<br>John Smith |
| Create | 102 | 10 | 2 | 0 | Phone#:<br>415-222-1234 |
| Edit | 101 | 10 | 3 | 0 | Name:<br>Jonathan Smith |
| Delete | 102 | 10 | 4 | 1 | Phone#:<br>415-222-1234 |

FIG. 7

| change_set_id | obj_id |
|---|---|
| 1 | 6 |
| 1 | 7 |

703
705

↑
701

| investigation_id | change_set_id | logical_clk |
|---|---|---|
| 1 | 1 | 101 |

| change_set_id | obj_id |
|---|---|
| 1 | 6 |
| 1 | 7 |
| 2 | 8 |

703
705
801

↑
701

| investigation_id | change_set_id | logical_clk |
|---|---|---|
| 1 | 1 | 101 |
| 1 | 2 | 105 |

706
802

↑
702

MANAGING DISCONNECTED INVESTIGATIONS

CROSS-REFERENCE TO RELATED APPLICATIONS

Benefit Claim

This application claims the benefit as a Continuation of application Ser. No. 13/747,170, filed Jan. 22, 2013, now U.S. Pat. No. 8,812,444, which is a Continuation of application Ser. No. 12/831,383, filed Jul. 7, 2010 (now U.S. Pat. No. 8,364,642), the entire contents of each of which is hereby incorporated by reference as if fully set forth herein, under 35 U.S.C. §120. The applicant(s) hereby rescind any disclaimer of claim scope in the parent applications or the prosecution history thereof and advise the USPTO that the claims in this application may be broader than any claim in the parent applications.

TECHNICAL FIELD

The present disclosure generally relates to distributed computing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Client-server computer systems are a pervasive form of distributed computing architecture. Client-server systems often employ a database for storing and retrieving data. A typical database is an organized collection of related data stored as "records" having "fields" of data. In a typical client-server system employing a database, client computing devices (clients) request services of server computing devices (servers) over a data network and servers modify and retrieve database data as part of servicing requests from clients.

As an intermediary between clients and the database, servers allow multiple clients to modify and retrieve database data concurrently while at the same time providing a consistent view of database data to all clients. Sharing new information between clients is a matter updating data in the database so that clients can retrieve the new information from the database. In essence, the database is the centralized and authoritative repository of information and the servers act as gatekeepers of the information through which all requests from clients to modify and retrieve the information must pass.

Typical client-server database systems are useful to users so long as the network connecting the clients to the servers is highly reliable. In these systems, servers execute much of the logic for modifying and retrieving database data and clients repeatedly request servers over a network to perform various data selection and manipulation functions. Thus, if the network between clients and servers is only periodically available, is completely unavailable, or is non-existent, then users of the clients cannot practically conduct an analysis on database data. However, some users (e.g., in-field or forward operating personnel) may wish to perform analysis on database data in locations where a network connecting clients and servers is only periodically available, is unreliable, or does not exist. In addition, these disconnected users may need to update database data at their remote location and incorporate their updates back into the central authoritative repository of database data shared with other users, all without any network access to the central authoritative repository. For these "disconnected" users, typical client-server database systems requiring a highly-available network connection are not adequate.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates tracking changes made to a shared data repository by an example and according to some embodiments of the invention.

FIGS. 7 and 8 illustrate a change set-object relation and an investigation-change set relation by an example and according to some embodiments of the invention.

DESCRIPTION OF EMBODIMENTS

Introduction

Figure 1:
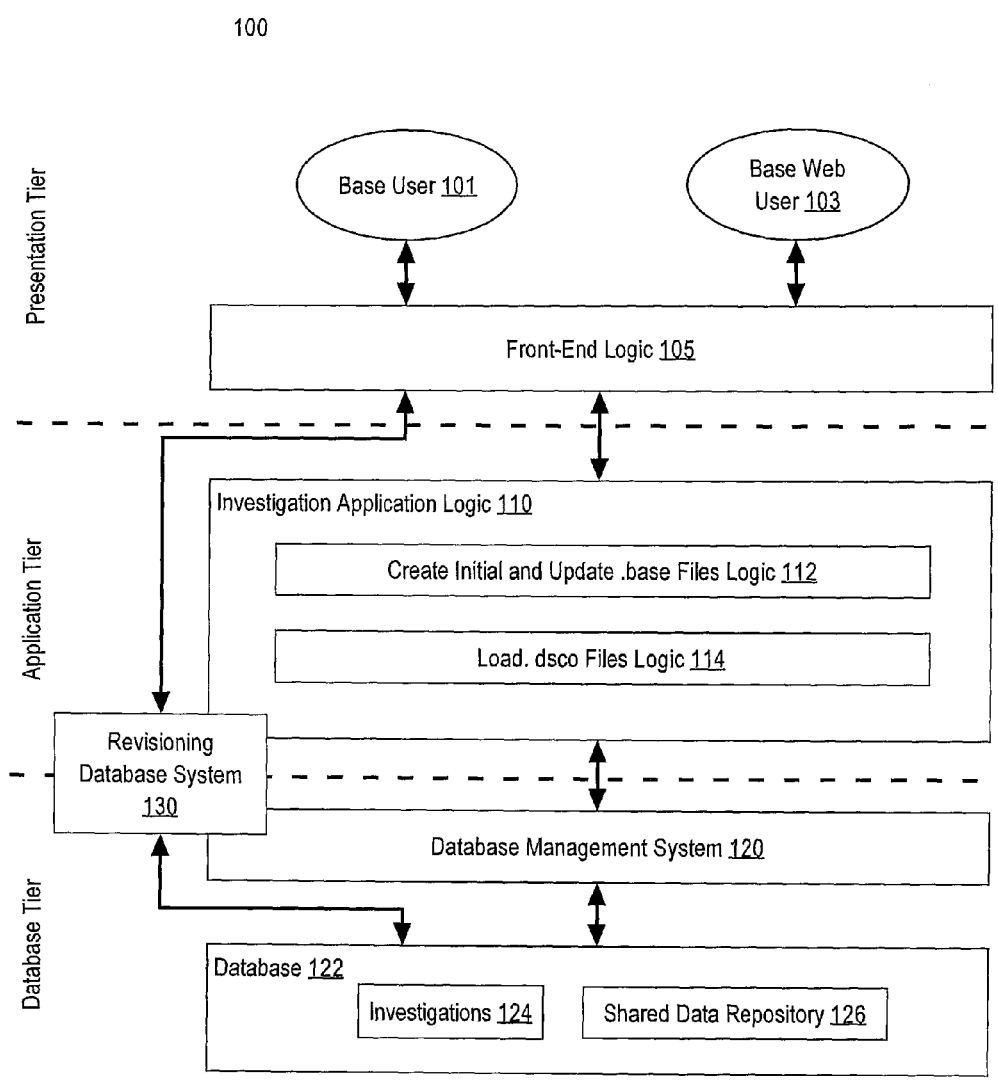
FIG. 1 is a block diagram illustrating a base installation according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present invention. The first object and the second object are both objects, but they are not the same object, unless otherwise clearly indicated.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Overview of Disconnected Investigations

A system and a method enable an information analyst to use a stand-alone computer-based investigation application to conduct a disconnected investigation in a remote location where network access to servers of the system might be only periodically available, unreliable, or non-existent. In addition, the system and method enable the disconnected investigation to incrementally incorporate ongoing updates made to investigative data stored in a shared repository of data, and to periodically synchronize disconnected investigative data with the shared data repository thereby incorporating investigative updates made to investigative data back into the shared data repository. Unlike prior approaches, an investigation can be conducted entirely without having any network connectivity at the investigation location.

As used herein, the term "investigation" refers to a separate line of inquiry or analysis on a subset of shared database data drawn from a shared data repository. Investigations allow information analysts to explore competing hypotheses. For example, if one analyst has a first hypothesis regarding a subset of database data, and another analyst has a second competing hypothesis regarding the same subset of database data, investigations allow both analysts to pursue their own hypothesis on the subset without interfering or contradicting each other.

During an investigation, changes made to the subset of data are not visible to other database users and do not conflict with changes to the subset made by other users either in another investigation or to the base copy of the subset in the shared data repository from which the investigative subset was drawn. Changes made during an investigation are made visible to other database users by "publishing" the changes to the shared data repository. Publishing changes to the shared data repository may require reconciliation with other changes made outside the context of the investigation. In some cases, reconciliation occurs automatically. In other cases, manual reconciliation is required.

In some embodiments, the system comprises two types of investigation application installations: a single base installation (also referred to herein as the base instance) and one or more disconnected installations (also referred to herein as disconnected instances). As used herein, the term "investigation application" refers to a software and/or hardware-based computing application for conducting investigations on database data. One non-limiting example of an investigation application is the Palantir Government platform available from Palantir Technologies of Palo Alto, Calif.

In some embodiments, the base installation comprises a full-featured installation of an investigation application on one or more high-powered server computing devices while each disconnected installation comprises a subset-featured installation of the investigation application on a relatively lower powered computing device such as a laptop computer. In operation, a user uses the base installation to create disconnected investigations, which are distributed to disconnected installations. Remote analysts use the investigation application in the disconnected installations to conduct these investigations and send back data to the base installation, where the data can be integrated into the shared data repository. If a network connection exists between the base and disconnected installations, investigations and investigative data can be exchanged online; otherwise they can be exchanged by using physical portable media, such as flash memory devices, compact-discs (CDs), digital versatile discs (DVDs), etc.

During an investigation, a disconnected installation can incorporate updates made to the shared data repository with only minimal interruption to the investigation. For example, the disconnected installation may only require a reboot or a restart after incorporating an update. Significantly, the updates can be incorporated at the disconnected installation without requiring the disconnected installation to communicate with the base installation. Thus, in contrast to prior approaches, the disconnected installation can incorporate updates without any network connectivity to the base installation. Further, incorporating shared data repository updates into a disconnected installation is a simple end-user operation.

In some embodiments, incorporating shared data repository updates into a disconnected installation involves a remote analyst using a pointing device such as a mouse to double-click on a file containing the updates. Also, a disconnected installation can periodically synchronize disconnected investigate data with the shared data repository at the base installation with only minimal or insubstantial interruption to the investigation. In particular, network connectivity between the disconnected installation and the base installation is not required to synchronize disconnected investigate data with the shared data repository. Advantageously, incorporating shared data repository updates into a disconnected installation, updating disconnected investigative data at the disconnected installation, and synchronizing disconnected investigative data with the shared data repository are not dependent on each other and can be performed in any order without requiring network connectivity from the disconnected installation to the base installation and without blocking or holding up the investigation at the disconnected installation.

Disconnected Investigations

In some embodiments, a disconnected investigation is initially created in the base installation by users who can provide an initial data set of the investigation from the shared data repository, add new data sets to the investigation, and update existing data sets of the investigation. Disconnected investigations and updates from the shared data repository are provided to disconnected installations in what will be referred to herein as ".base" files. Note that the name of the file is arbitrary and is not limited to any particular file name or format. Remote analysts load the .base files into their disconnected installations to conduct disconnected investigations. Periodically, the remote analysts provide results from the disconnected investigations to the base installation in what will be referred to herein as ".dsco" files. Again, the name of the file is arbitrary and is not limited to any particular file name or format. Information from .dsco files is integrated into the base copy of the disconnected investigation at the base installation and published to the shared data repository.

In some embodiments, the initial .base file created for a disconnected investigation contains the actual investigation and may include, among other information, one or more of: investigation metadata, investigative data, data sources where the investigation data originated, a quantity of globally unique random identifiers, and current setting of system properties in the base installation. Subsequent .base files created for the same disconnected investigation are smaller than the initial .base file, and may include, among other information, one or more of: information about new, changed, or deleted investigative data, any associated data source not already provided, additional globally unique random identifiers, if needed, and current settings of any changed system properties changed in the base installation. Techniques for generating subsequent .base files for the same disconnected investigation that are smaller than the initial .base file are described in greater detail below.

In some embodiments, remote analysts create .dsco files in disconnected installations and use them to deliver interim and final results of their disconnected investigations to the base installation. Each .dsco file may include, among other information, one or more of: investigation metadata, information about all new, changed, or deleted investigation data, and any new data sources imported into the investigation.

Base Installation

FIG. 1 is a block diagram illustrating a base installation 100 according to some embodiments of the invention. A database 122 managed by a database management system 120 is coupled to investigation application logic 110 which implements functions describe herein for managing disconnected investigations. A user terminal (not shown) is coupled to front-end logic 105 which is coupled to investigation application logic 110. The user terminal may be any host computer of an intelligence analyst, database administrator, or other user who interacts with database 122 through application logic 110. Front-end logic 105 can be web-based in which the host computer is configured with a standard web browser application for interacting with front-end logic 105. Front-end logic 105 may also be "thick" client-based in which case the host computer is configured with a specific desktop application that is configured specifically for interacting with front-end logic 105. Base installation 100 can be implemented by multiple computing devices within TCP/IP network in a headquarters environment.

In some embodiments, database 122 comprises both a shared data repository 126, where all shared data is stored and published, and an investigation repository 124, where investigations including base copies of disconnected investigations are stored. Users 101 and 103 in the base installation 100 support remote analysts in disconnected installations by creating and managing their disconnected investigations, and by integrating the results of their investigations into base installation 100.

Users 101 and 103 in base installation 100 prepare sources of data in shared data repository 126 for disconnected investigations. Users 101 and 103 can also review results of disconnected investigations and selectively publish investigation data to shared data repository 126. Users 101 and 103 use sources of data in shared data repository 126 to add new and changed data to disconnected investigations being conducted by remote analysts. Users 101 and 103 package the investigations and investigation updates in .base files, and provide the files to remote analysts. Users 101 and 103 receive .dsco files from the remote analysts, un-package the data they contain, and make the data available for users 101 and 103 to review and publish selectively.

Disconnected Installation

Figure 2:
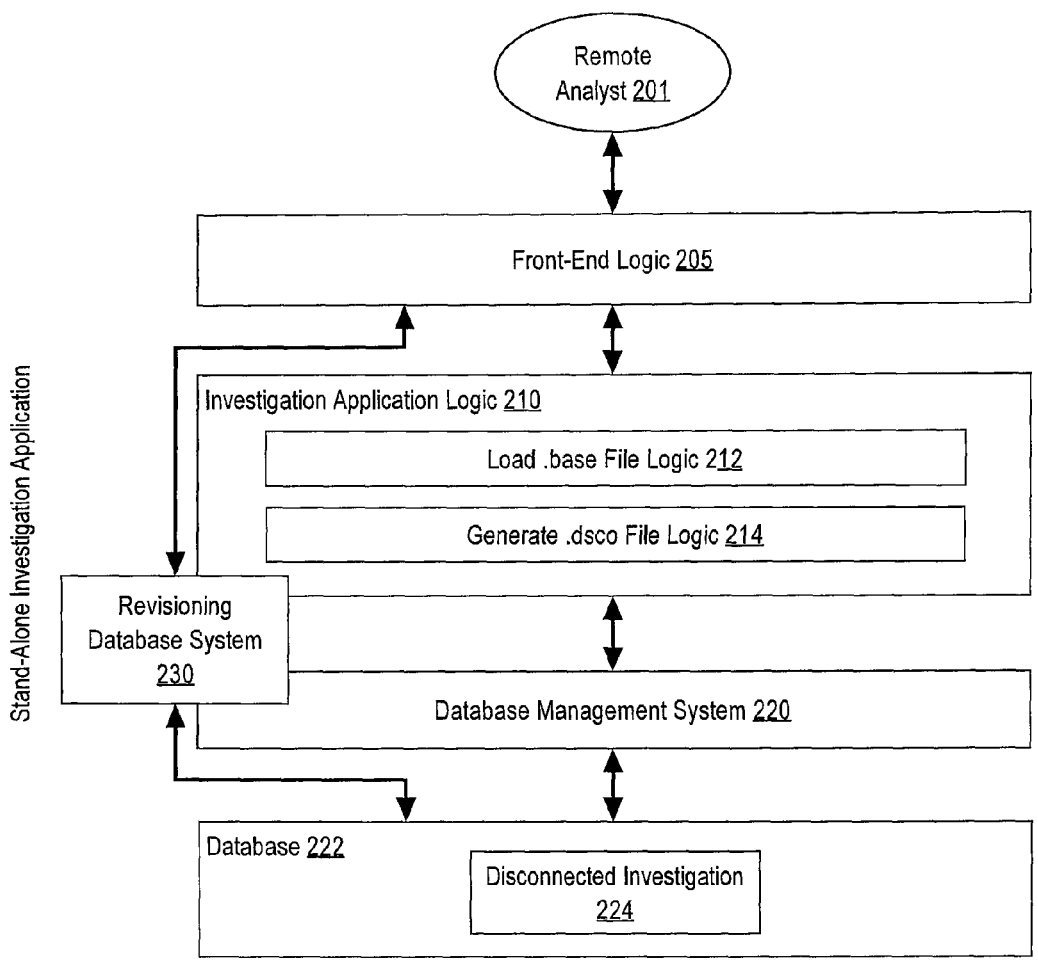
FIG. 2 is a block diagram illustrating a disconnected installation according to some embodiments of the invention.

FIG. 2 is a block diagram illustrating a disconnected installation 200 according to some embodiments of the invention. Disconnected installation 200 is a version of the investigation application for use by remote analyst 202 as a mobile, stand-alone system that is not connected directly to base installation 100. Disconnected installation 200 might reside, for example, on a powerful laptop computer that is deployed within a designated area of responsibility.

A remote analyst 202 begins or updates a disconnected investigation by loading .base files generated by base installation 101 into disconnected installation 200. The remote analyst 202 conducts the disconnected investigation by using front-end logic 205 and investigation application logic 210 in disconnected installation 200. The remote analyst 202 periodically synchronizes disconnected investigation data 224 with base installation 100 by packaging updated disconnected investigative data in .dsco files, and providing the files to base installation 100 either over a network or on transportable physical computer-readable media physically delivered to base installation 100 by mail, courier, etc.

In some embodiments in which a network connection is available or periodically available between base installation 100 and disconnected installation 200, remote analyst 202 connects to and logs on to a web server in base installation 100 to (1) generate and download .base files containing new disconnected investigations, or updates to existing investigations and to (2) upload .dsco files, and integrate the data they contain into base installation 100. In another embodiment in which there is no network connection available between base installation 100 and disconnected installation 200, remote analyst 202 receives .base files from base installation 100 and sends .dsco files to base installation 100 on portable physical media, such as flash memory devices, compact-discs (CDs), digital versatile discs (DVDs), etc.

Revisioning Database System

In some embodiments, base installation 100 employs a revisioning database system 130 to track all changes made to shared data repository 126, to provide separate data spaces for investigations, and to provide granular sharing of investigative changes through the shared data repository 126. Revisioning database system 130 may be implemented in whole or in part by both investigation application 110 and database management system 120. In addition, all or part of revisioning database system 130 may be implemented by a system separate from both investigation application 110 and database management system 120.

In some embodiments, revisioning database system 130 comprises computer-executable logic implementing functions and features of a revisioning database system described herein using a traditional database management system. In this embodiment then, database management system 120 may be a commercially available database management system such as those available from the Oracle Corporation of Redwood Shores, Calif. and the Microsoft Corporation of Redmond, Wash. and revisioning database system 130 comprises computer-executable logic implementing functions and features of a revisioning database system described herein using the commercially available database management system.

In one aspect, revisioning database system 130 differs from other types of database systems in that revisioning database system 130 is capable of answering a query about the state of data stored in shared data repository 126 at a point in time in the past as opposed to only being able to answer a query about the current state of data. With revisioning database system 130, in combination with front-end logic 105, users can determine when a particular piece of data was added or edited in shared data repository 126 and the data source of the addition or edit. In this context, the term "data source" refers to a source of database data stored in shared data repository 126. Generally, there are two types of data sources: (1) manually entered data from users and (2) automatically imported data from data sources such as spreadsheets, documents, other systems, etc. Thus, revisioning database system 130, through its capability to track all changes to data stored in shared data repository 126, enables users to determine what was "known" about database data at a particular point in time in the past.

In some embodiments, revisioning database system 130 is capable of tracking all changes made to shared data repository 126. As used herein, the term "data object" or just "object" refers broadly and generally to data that represents an entity (person, place, or thing), event, or document. Each object can have one or more object components. Non-limiting examples of types of object components include properties and links. As used herein, the term "property" refers broadly and generally to data represents a feature or characteristic of an object. Different types of objects may have different types of properties. For example, a "Person" object might have an "Eye Color" property and an "Event" object might have a "Date" property. Objects can have connections or associations through links. A used herein, the term "link" refers broadly and generally to data that represents connections or associations between objects including relationships, events, and matching properties. Links may contain multiple connections. For example, two "Person" objects representing a husband and a wife could be connected through a relationship ("Spouse Of"), a matching object property ("Address"), and an event ("Wedding").

In some embodiments, to track all changes made to shared data repository 126, revisioning database system 130 creates a new database record in database 122 for every creation, edit, or deletion of an object or an object component. Once a database change record is created, it is not modified thereby preserving a historical record of the corresponding change. To track the ordering of changes, revisioning database system 130 employs a logical clock that models all changes as a linear sequence of database events. The logical clock provides a total ordering for all changes in shared data repository 126. In addition, the logical clock provides atomicity for changes as multiple changes can occur at the same point in the linear sequence of database events represented by the logical clock.

FIG. 5 illustrates tracking changes made to shared data repository 126 by an example and according to some embodiments of the invention. As shown in FIG. 5, each record 502, 504, 506, 508, and 510 in table 501 represents a creation, edit, or deletion of an object or an object component. The fields of each change record include a 'obj_comp_id' field identifying the object or the object component that was created, edited, or deleted by the change, an 'obj_id' field identifying the object that was created, edited, or deleted by the change, a 'logical_clk' field that identifies the order of the change in a total ordering of all changes made to shared data repository 126, a 'deleted' field indicating whether the change was a deletion of an object or an object component, and a '<values>' field indicating, for changes that create or edit a value, the value that resulted from the change or, for changes that delete a value, the value that was deleted.

For example, referring to FIG. 5, at logical clock event 1, an object of type "Person" was created. Also at logical clock event 1, a "Name" property of the object was created and given the value "John Smith". Later, at logical clock event 2, a "Phone #" property of the object was created and given the value "415-222-1234". At logical clock event 3, the "Name" property of the object that was created at logical clock event 2 was edited with the value "Jonathan Smith". At logical clock event 4, the "Phone #" property that was created at logical clock event 3 was deleted. The state of the object at logical clock event 4 as a result of these changes is an object of type "Person" with the property "Name" having a value "Jonathan Smith".

By preserving all changes made to an object in the form of change records, revisioning database system 130 is able to provide the state of an object at a point in time in the past. For example, referring again to FIG. 5, it can be seen from change records 502, 504, and 506 that the state of the object at logical clock event 2 was an object of type "Person" with a property "Name" having a value "John Smith" and a property "Phone#" having a value "415-222-1234".

FIG. 5 illustrates but one example scheme that revisioning database system 130 could employ to track all changes to shared data repository 126 and embodiments of the invention should not be construed as being limited to only the one example scheme or be construed as requiring all details of the one example scheme. For example, instead of storing all change records for an object in a single table as depicted in FIG. 5, the change records might be stored across multiple tables, or change records for multiple objects might be stored in a single table. Further, the change records may contain other fields that are not depicted in FIG. 5. For example, each change record may have an additional version field that serves as a single primary key for the change record as opposed to using a combination of the 'obj_comp_id' and the 'logical_clk' fields as the primary key. Other useful fields could include a 'time created' field storing the date/time the corresponding object or object component was created, a 'created by' field for storing an identifier of a user that created the change record, and a 'last modified' time field storing the date/time the correspond change was made.

Overall Disconnected Investigation Workflow

Figure 3:
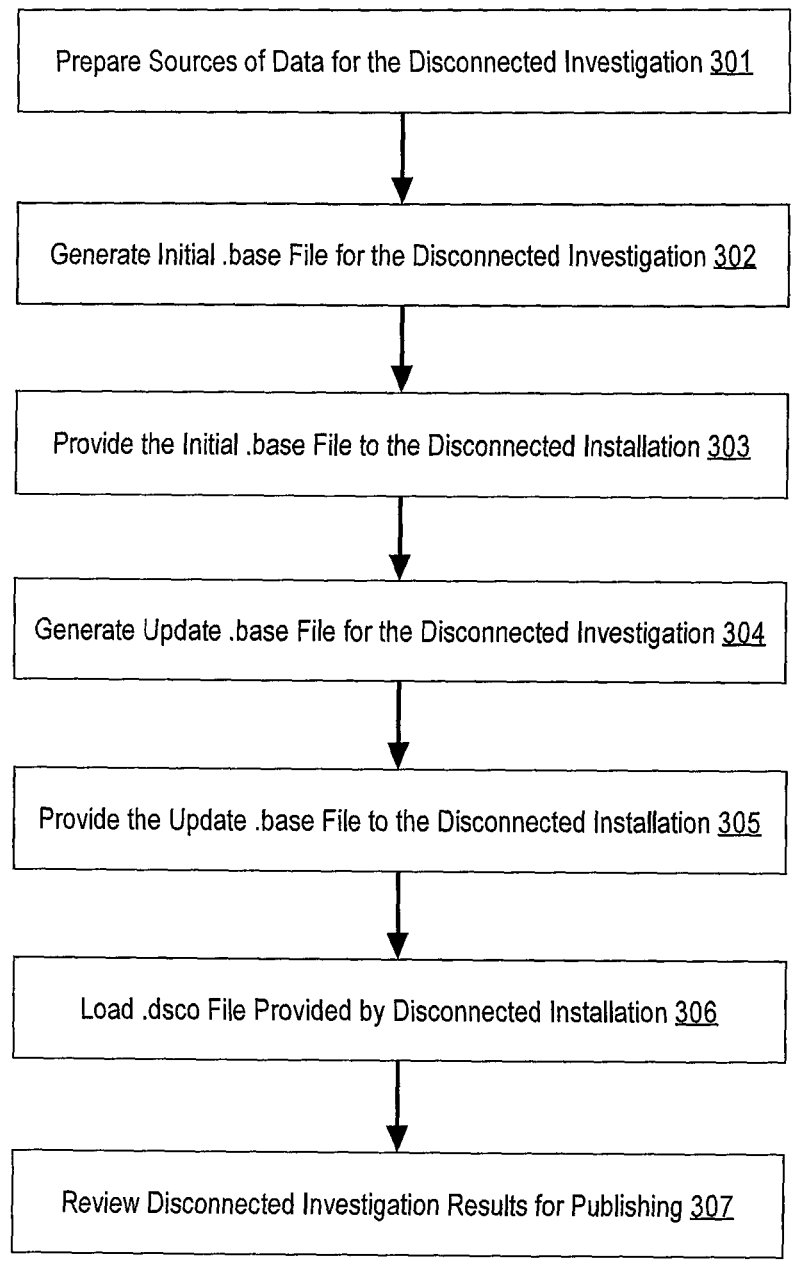
FIGS. 3 and 4 in combination depict an overall workflow for managing a disconnected investigation at a base installation and a disconnected installation according to some embodiments of the invention.
Figure 4:
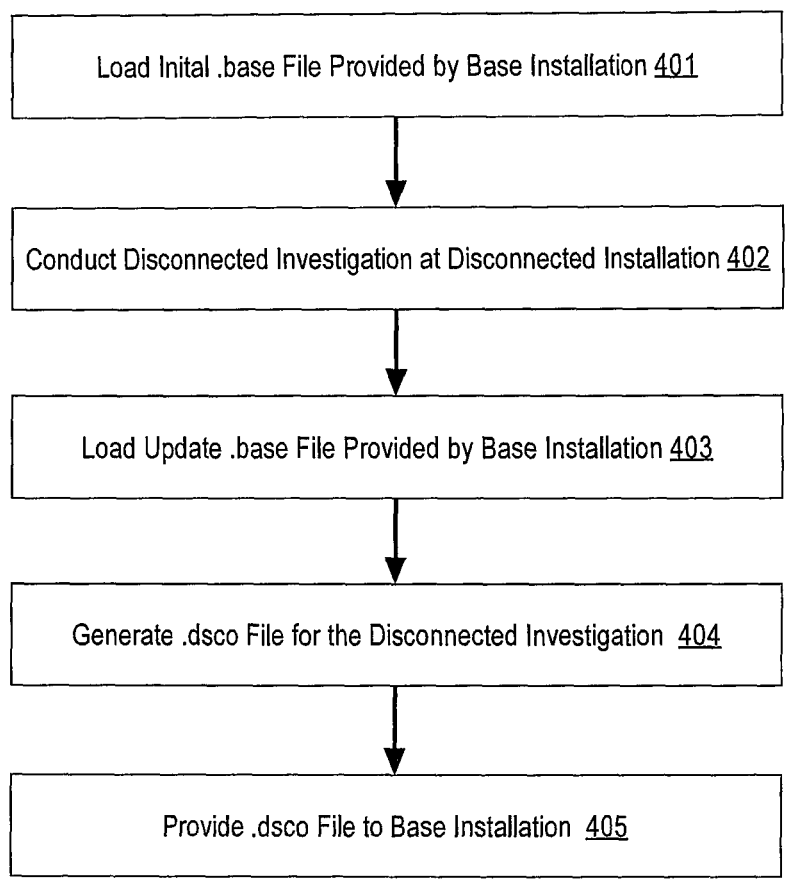

FIGS. 3 and 4 in combination depict an overall workflow for managing a disconnected investigation at a base installation and a disconnected installation according to some embodiments of the invention. FIG. 3 depicts the portion 300 of the workflow for managing the disconnected investigation at the base installation. FIG. 4 depicts the portion 400 of the workflow for managing the disconnected investigation at the disconnected installation. The overall workflow will now be explained with reference to base installation 100 of FIG. 1 and disconnected installation 200 of FIG. 2.

Preparing Sources of Data for the Disconnected Investigation

The overall workflow starts at base installation 100 where, at step 301, sources of data for the disconnected investigation are prepared. In general, preparing sources of data for the disconnected investigation includes specifying criteria to investigation application logic 110 for use by investigation application logic 110 in identifying objects stored in shared data repository 126 that will be the subject of the disconnected investigation. The investigation subject criteria can be in the form of a query or a filter or a combination of queries and filters. A query specifies selection criteria that objects in shared data repository 126 must satisfy (or not satisfy as the query may specify) to be selected by the query. A query may contain simple search terms, such as strings of text, or various types of complex expressions in which multiple search terms and search expressions are combined using logical operators such as AND, OR, and NOT. A filter selects objects in shared data repository 126 by examining objects within a specific group of objects and selecting objects with the specific group that satisfy the filter's selection criteria. A query may be combined with a filter such that the query selects a specific group of objects to which the filter is applied to produce a final set of selected objects.

By virtue of the investigation subject criteria, the objects in shared data repository that are the subject of a disconnected investigation may change over the course of the disconnected investigation. For example, when a new disconnected investigation is created, a first set of objects may be initially selected by the investigation subject criteria. Thereafter, when an update for the disconnected investigation is generated, the investigation subject criteria may select of a second set of objects that includes the first set of objects in addition to a set of additional objects not included in the first set of objects.

Techniques are described herein for generating an update .base file that includes only the investigative data needed to bring a disconnected installation up-to-date according to the investigation subject criteria. For example, according to some embodiments, an update .base file generated for the disconnected investigation would include changes to the first set of objects that were made between when the disconnected investigation was created and when the update was generated, but the update .base file would not include any changes to the first set of objects that were made before the disconnected investigation was created. In addition, the update .base file will include all changes to the additional objects in the second set of objects.

Figure 6:
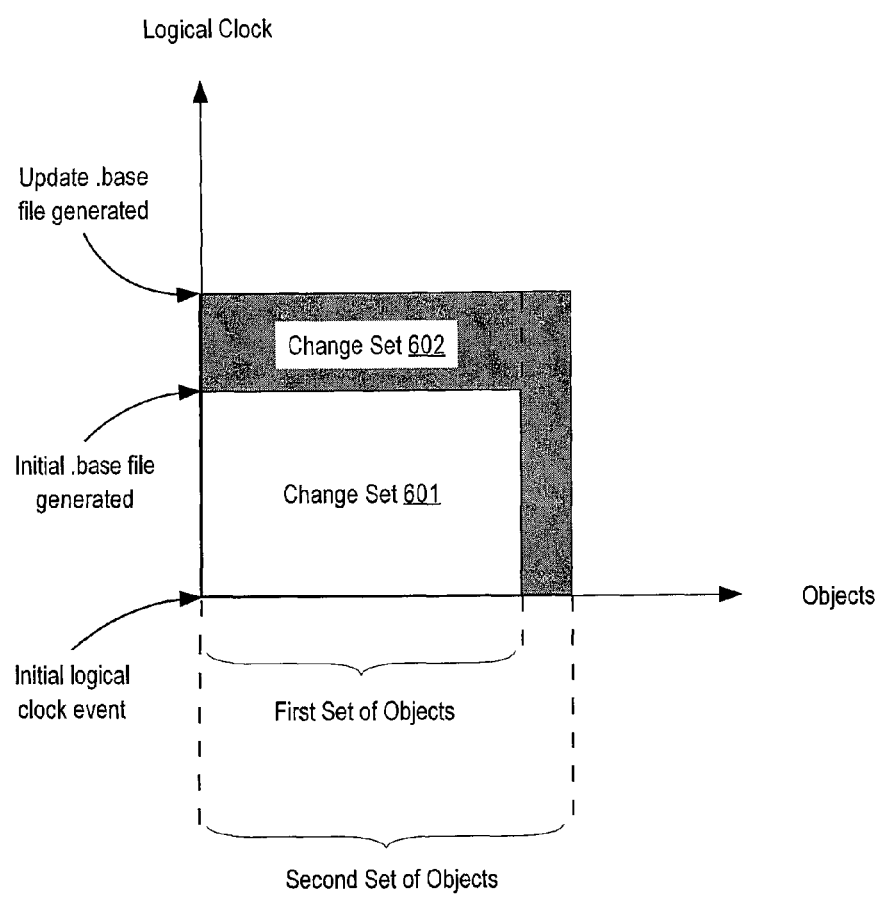
FIG. 6 illustrates an example of generating change sets according to some embodiments of the invention.

This example is illustrated in chart form in FIG. 6. As shown in FIG. 6, change set 601 includes changes made to the first set of objects between an initial logical clock event and a logical clock event corresponding approximately or exactly to when the initial .base file was generated. As shown by darker shading in FIG. 6, change set 602 includes only those changes made to the first set of objects between the logical clock event corresponding to when the initial .base file was generated and a logical clock event corresponding approximately or exactly to when the update .base file was generated. In addition, change set 602 includes all changes made to the additional set of objects in the second set of objects between the initial logical clock event and the logical clock event corresponding to when the update .base file was generated. Thus, change set 602 includes only the changes needed to bring a disconnected installation having applied change set 601 up-to-date.

Creating the Disconnected Investigation

The overall workflow proceeds to step 302 where the disconnected investigation in the form an initial .base file is created. Creating the disconnected investigation includes generating an identifier that uniquely identifies the disconnected investigation within database 122 and applying the investigation subject criteria specified in step 301 against shared data repository 126 to identify an initial set of objects that are initially the subject of the disconnected investigation. In some embodiments, the initial .base file corresponding to the new disconnected investigation sent to disconnected installation 200 includes change records for the initial set of objects as maintained by revisioning database system 130.

When the new disconnected investigation is created, an initial change set for the disconnected investigation is identified based on the initial set of objects selected by the investigation subject criteria. In particular, for each object in the initial set of objects, change records for the object are selected from shared data repository 126. The change records selected for each object in the initial set of objects correspond to change records for the object having a logical clock value that is greater than an initial logical clock value and less than a current logical clock value.

In some embodiments, creating a new disconnected investigation (including selecting the initial set of objects and the change records for the initial set of objects) is an atomic operation that is assigned its own logical clock value. In some embodiments, the current logical value is the logical clock value assigned to the operation of creating the new disconnected investigation. In another embodiment, creating a new disconnected investigation does not increment the logical clock and the current logical clock value is a current value of the logical clock at or near the time the new disconnected investigation is created. In some embodiments, the initial logical clock value is the earliest logical clock value (e.g., 0). In another embodiment in which the disconnected investigation need not start with the entire history of changes made to the initial set of objects, the initial logical clock value may be greater than the earliest logical clock value.

To track what change sets have been generated for the disconnected investigation, two relations are maintained in database 122 by investigation application logic 110 in base installation 100. An "investigation-change set" relation associates disconnected investigations, change sets, and logical clock values. A "change set-object" relation associates change sets and objects. These relations may be implemented in database 122 in any convenient manner using a number of database models such as, for example, a relational model, a object-relational model, an object model, a hierarchical model, combinations thereof, etc.

At a high level, the investigation-change set relation identifies what change sets have been generated for which investigations and when those change sets were generated according to the logical clock at base installation 100. The change set-object relation identifies what objects were selected by investigation subject criteria for inclusion in which change sets.

FIG. 7 illustrates a change set-object relation 701 and an investigation-change set relation 702 by an example and according to some embodiments of the invention. Assume the investigation subject criteria for the new disconnected investigation selected objects 6 and 7 as the initial set of objects. In a practical embodiment, the initial set of objects may include many hundreds or even many thousands of objects. As mentioned above, once the initial set of objects is obtained, an initial change set for the initial set of objects is selected. The initial change set for the initial set of objects is assigned an identifier uniquely identifying the change set at least among all change sets that will be generated for the disconnected investigation. In this example, initial change set 1 includes all change records for objects 6 and 7 that were created between an initial logical clock value (e.g., 0) and a current logical clock value. A record of what objects were selected for the initial change set is stored in database 122 according to the change set-object relation. For example, FIG. 7 shows two records 703 and 705 indicating that objects 6 and 7 were selected for initial change set 1.

In addition to keeping a record in database 122 of what objects were selected for the initial change set, a record is also kept of when the initial change set was generated for the new disconnected investigation according to the logical clock at base installation 100. For example, FIG. 7 shows record 706 indicating that initial change set 1 was generated for disconnected investigation 1 at local clock event 101. Note that order in which change sets were generated for a particular disconnected investigation can be determining from the investigation-change set relation based on the logical clock field.

Providing the Disconnected Investigation to the Disconnected Installation

Next, the overall workflow proceeds to step 303 where the initial .base file generated in step 302 is provided to disconnected installation 200. In some embodiments, providing the initial .base file to disconnected installation 200 includes making the initial .base file available for download over a periodically available network connecting base installation 100 and disconnected installation 200. In another embodiment in which there is no network connection available between base installation 100 and disconnected installation 200, the initial .base file is stored in a portable device or computer-readable medium such as a flash drive, a Compact Disc (CD), or a Digital Versatile Disc (DVD), and delivered manually to disconnected installation 200.

Loading the Disconnected Investigation

Turning to FIG. 4, at step 401, the initial .base file is loaded into disconnected installation 200. It should be noted that there is no requirement that the initial .base file be loaded into a disconnected installation before an update to the initial .base file is generated at the base installation. Therefore, step 304 of process 300 may performed, even repeatedly, before and after step 401 of process 400.

In some embodiments, loading the new disconnected investigation is performed manually by the remote analyst at disconnected installation 200. The initial .base file is placed by the remote analyst on a file system accessible by a computing device hosting the stand-alone investigation application. Loading the initial .base file into disconnected installation 200 includes the remote analyst double-clicking on the initial .base as presented in a file system browsing application provided by an operating system of the computing device thereby causing investigation application logic 210 to incorporate the change records stored in the initial .base file into database 222. Incorporating the change records into database 222 includes investigation application logic 210 instantiating disconnected investigation 224 in database 222 with the change records stored in the initial .base file. Other actions may be performed by remote analyst to accomplish the same. For example, starting the stand-alone investigation application and using a file browser provided by the investigation application to locate and open the initial .base file. As another example, the remote analyst may use a pointing device such a mouse to drag and drop the initial .base file onto a desktop icon representing the stand-alone investigation application.

Conducting the Disconnected Investigation

Once an initial .base file has been loaded, the remote analyst at disconnected installation 200 is ready to conduct the disconnected investigation. During the course of the disconnected investigation, the remote analyst may load updates to the disconnected investigation in the form of update .base files received from base installation 100 and may generate interim or final results of the disconnected investigation in the form of .dsco files. The remote analyst may conduct the disconnected investigation, load updates, and generate results without a network connection to the base installation.

The complete set of potential disconnected investigative activities the remote analyst can perform at disconnected installation 200 using investigation application logic 220 is beyond the scope of this application. However, potential disconnected investigative activities performed using investigation application logic 220 can include: viewing, creating, changing, and deleting objects, object metadata, object components and links stored in database 222; searching for information in database 222 using queries and filters; tagging text in documents to create or change objects, object properties, and links stored in database 222; adding objects to graphs and working with graphs to create objects and link objects together in database 222; searching for, visualizing, analyzing, exporting, printing, or saving data stored in database 222; working with graphical maps to search for information using route, radius, and polygon geosearches; creating and using heat maps; visualizing, analyzing, exporting, printing, and saving geographical information; creating, changing, and using filters to find objects in database 222 and adding found objects to graphs and maps; creating and using graphical timelines to find time ranges among object and property data, creating visual chronologies of related behaviors and events, and analyzing the chronologies to discover patterns and trends; creating and using histograms to discover correlations between objects, properties, and links, interconnections between objects, and patterns and trends among activities and behavior; and highlighting information in graphs, maps, and data sources by selecting different groups of objects, properties, or links within histograms.

In some embodiments, conducting the disconnected investigation in disconnected installation 200 involves use of revisioning database system 230 such that all changes made by the remote analyst 201 to objects that are part of the disconnected are tracked. Revisioning database system 230 ensures that change records incorporated into database 224 from an initial .base file or an update .base file are not modified preserving the historical record of changes to objects at disconnected installation 200. At the same time, revisioning database system 230 allows the remote analyst 201 to make changes to objects based on change records for those objects received from base installation 100.

Generating an Update for the Disconnected Investigation

Returning to FIG. 3, at step 304 an update for the disconnected investigation is generated at base installation 100 in the form of an update .base file. In some embodiments, generating an update for the disconnected investigation includes applying investigation subject criteria against shared data repository 126 to identify the update set of objects that are the subject of the disconnected investigation. For the purpose determining what change records are part of the update for the disconnected investigation, the update set of objects supersedes the initial set of objects and any previous update set of objects selected for the disconnected investigation.

The investigation subject criteria used to identify the update set of objects can be the same investigation subject criteria used to select the initial set of objects or a previous update set of objects. Alternatively, new investigation subject criteria may be specified to investigation application logic 110 for selecting the update set of objects. In any case, the update set of objects selected for the update may include new objects that were not previously the subject of the disconnected investigation. In some embodiments, the update .base file generated for the disconnected investigation and sent to disconnected installation 200 includes only the change records necessary to bring the disconnected investigation at disconnected installation 200 up-to-date with respect to the change records included in the initial .base file and any previous update .base files that have already been incorporated into disconnected installation 200.

To generate the update for the disconnected investigation, an update change set for the disconnected investigation is identified based on the update set of objects selected by the investigation subject criteria. Identifying the update change set for the disconnected investigation includes identifying any objects in the update set of objects that are new to the disconnected investigation and identifying any objects in the update set of objects that are already part of the disconnected investigation by virtue of being included in a previous change set generated for the disconnected investigation.

In some embodiments, an object is never "deleted" from a disconnected investigation. Instead, objects that were included in a previous change set but that are not selected by the investigation subject criteria for inclusion in the update set of objects are treated as if they were selected by the investigation subject criteria for inclusion in the update set of objects. However, change records included in the update .base file for these "deleted" objects may include information indicating that the change records are not currently active. If such an object is selected for inclusion in a subsequent update set of objects, then the update .base file generated the subsequent update can include information indicating that the change records for the object included in the previous update are now active. In this way, change records for a "deleted" object that is re-included in the disconnected investigation are sent only once from the base installation to the disconnected installation.

For objects in the update set of objects that are new to the disconnected investigation, all change records stored in shared data repository 126 for the new objects may be needed to bring the disconnected installation up-to-date. In some embodiments, identifying objects in the update set of objects that are new to the disconnected investigation involves use of the change set-object relation and information provided by the disconnected installation about the change set in the ordered set of change sets generated for the disconnected investigation that was last incorporated by the disconnected installation. Information about the change set in the ordered set of change sets generated for the disconnected investigation that was last incorporated by the disconnected installation can be provided by disconnected installation to base installation in a variety of manners including, for example, over a periodically available network connection between the base installation and the disconnected installation or in a .dsco file provided by the disconnected installation to the base installation. The change set in an ordered set of change sets generated for a disconnected investigation that was last incorporated by a corresponding disconnected installation is referred to herein as the "last acknowledged change set" for the disconnected investigation.

At a high level, identifying objects in the update set of objects that are new to the disconnected investigation includes determining the set of objects in the update set of objects that are not included in any previous set of objects generated for the disconnected investigation either as part of creating the disconnected investigation or generating a previous update for the disconnected investigation. In some embodiments, the change records included in the update .base file for an object new to the disconnected investigation correspond to the change records for the object stored in shared data repository 126 that would be included if a new disconnected investigation (i.e., an initial .base file) were being generated at the same logical clock event corresponding to generation of the update .base file.

Returning to the example discussed above with respect to FIG. 7, assume the investigation subject criteria for the update to the disconnected investigation selected objects 6, 7, and 8 as the update set of objects. As indicated by change-set-object relation 701, only objects 6 and 7 were included in change set 1 when the disconnected investigation was created. A set operation involving the objects included in change set 1 and the update set of objects reveals that object 8 is new to the disconnected investigation. Accordingly, the change records included in the update .base file for object 8 correspond to the change records for object 8 stored in shared object repository 126 having a logical clock value greater than an initial logical clock value and less than a current logical clock value.

For each object newly added to a disconnected investigation by an update, a record is created and stored in database 122 according to the change set-object relation that indicates the change set for the disconnected investigation in which the new object was first selected for inclusion. For example, as shown in FIG. 8, a new record 801 is added according to the change set-object relation 701 indicating that new object 8 was first selected for inclusion in change set 2.

In addition, a record is created and stored in database 122 according to the investigation-change set relation identifying the update change set generated for the disconnected investigation and when the update change set was generated according to the logical clock at base installation 100. For example, as shown in FIG. 8, a new record 802 is added according to the investigation-change set relation 702 identifying that update change set 2 was generated for disconnected investigation 1 at logical clock event 105. It should be noted that there is no requirement that a .base file include change records of only one change set and a .base file may include change records of more than one change set. Thus, the .base file may be viewed as a container for one or more change sets.

In addition to change records for objects new to the disconnected investigation, the update .base file also includes change records for objects in the update set of objects set that are already included in the disconnected investigation that are necessary to bring the corresponding disconnected installation up-to-date with respect to the already included objects. However, in contrast to objects in the update set of objects that are new to the disconnected investigation, the change records selected from shared data repository 126 for each already included object in the update set of objects correspond to the change records for the object having a logical value that is greater than the logical clock value for the lack acknowledged change set according to the investigation-change set relation and less than a current logical clock value. For example, referring to the example of FIG. 8, assume the last acknowledged change set by disconnected installation 200 when change set 2 is being generated is change set 1. The change records for object 6 selected from shared data repository 126 for inclusion in the update .base file for change set 2 correspond to the change records for object 6 having a logical clock value greater than the logical clock for change set 1 (101) and less than a current logical clock value (105). Similarly for object 7. Thus, in contrast to object 8, the change records for objects 6 and 7 included in the update .base file include only those change records necessary to bring disconnected installation 200 up-to-date with respect to previously incorporated change set 1.

Figure 9:
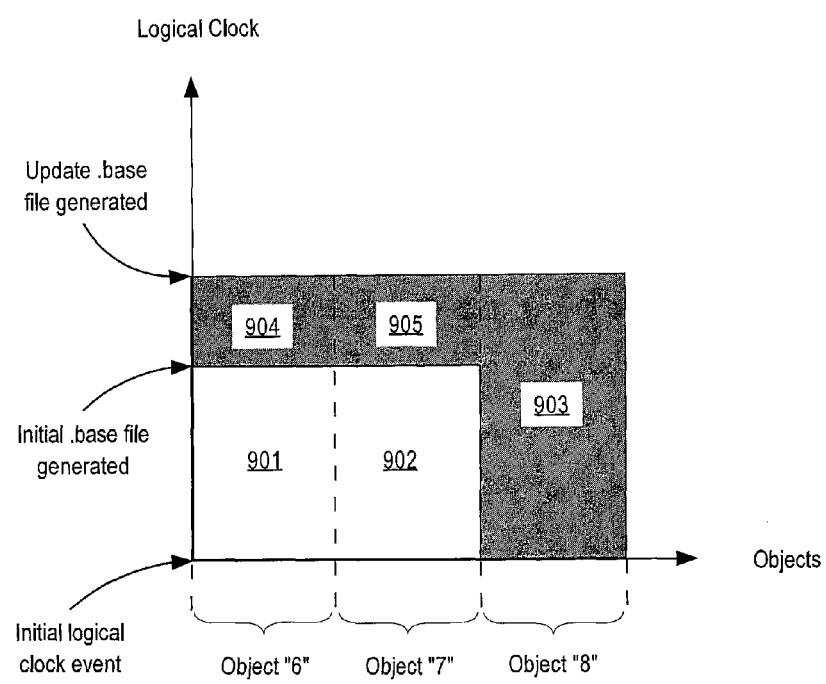
FIG. 9 illustrates an example of generating change sets according to some embodiments of the invention.

This example is depicted in chart form in FIG. 9. In FIG. 9, change set 1 comprises change records 901 and 902 and change set 2 comprises change records 903, 904, and 905. Change records 901 included in change set 1 correspond to changes made to object 6 in shared data repository 126 between an initial logical clock event at base installation 100 and a logical clock event corresponding to when change set 1 was generated at base installation 100. Similarly, change records 902 included in change set 1 correspond to changes made to object 7 between the initial logical clock value and the logical clock event corresponding to when the disconnected investigation was created. Turning to change set 2 generated for an update to the disconnected investigation, change records 903 included in change set 2 correspond to changes made to object 8 between the initial logical clock event and a logical clock event corresponding to when change set 2 was generated at base installation 100. Change records 904 included in change set 2 correspond to change made to object 6 between the logical clock event corresponding to when the initial .base file was generated and the logical clock event corresponding to when the update .base file generated. Similarly, change records 905 included in change set 2 correspond to change made to object 7 between the logical clock event corresponding to when the initial .base file was generated and the logical clock event corresponding to when the update .base file generated. Thus, assuming disconnected installation 200 had acknowledged incorporating change set 1 to base installation 100 at the time change set 2 is generated, then change set 2 includes only the change records necessary to bring disconnected installation 200 up-to-date with respect to change set 1.

Providing the Update for the Disconnected Investigation to the Disconnected Installation At step 305, the update .base file generated in step 304 is provided to disconnected installation 200. Providing the update .base file to disconnected installation 200 may be performed in the same manner in which the initial .base file was provided to disconnected installation 200. In some embodiments, providing the update .base file to disconnected installation 200 includes making the update .base file available for download over a periodically available network connecting base installation 100 and disconnected installation 200. In another embodiment in which there is no network available between base installation 100 and disconnected installation 200, the update .base file is stored in a portable device or computer-readable medium such as a flash drive, a Compact Disc (CD), or a Digital Versatile Disc (DVD), and delivered manually to disconnected installation 200.

In some embodiments, steps 304 and 305 are performed periodically to keep disconnected installation 200 up-to-date with the respect to changes made by other users and other investigations to investigative objects in shared data repository 126.

Loading the Update for the Disconnected Investigation

Turning to FIG. 4, at step 403, the update .base file provided to disconnected installation 200 at step 305 of FIG. 3 is loaded into disconnected installation 200. Loading the update for the disconnected investigation causes the change records in the update .base file to be incorporated into database 222. In some embodiments, loading the update for the disconnected investigation is performed manually by a remote analyst at disconnected installation 200 in a similar manner used to load the initial .base file at step 401, for example, by double-clicking on the update .base file.

In the case where the change records in the update .base file do not conflict with changes made to investigative data in database 222, the change records are added to the existing change records stored in database 222 such as those received in prior .base files and any change records in database 222 added by the remote analyst. However, an update .base file may contain change records from the shared data repository 126 that conflict with changes made to investigative data in database 222. For example, before loading an update .base file that includes a change record from shared data repository 126 for a change to a property of an object, a remote analyst at the disconnected installation 200 may have changed the same property of the same object in database 222.

In some embodiments, incorporate .base file logic 212 of investigation application logic 210 includes logic for determining a total ordering of change records in an update .base file and database 222 and logic for detecting potential causality violations at disconnected installation 200. In the context of loading an update .base file, a potential causality violation occurs when the update .base file includes a change record corresponding to a change made to shared data repository 126 at base installation 100 that was not, but should have been, based on a change made to database 122 at disconnected installation 200. Specific techniques for determining a total ordering of change records in an update .base file and database 222 and techniques for detecting potential causality violations are beyond the scope of this application but could include, for example, use of vector clocks, Lamport timestamps, version vectors, matrix clocks, etc.

In some embodiments, disconnected installation 200 employs its own logical clock separate from the logical clock at base installation 100 for the purpose of determining a total ordering of change records in an update .base file and database 222 and for the purpose of detecting potential causality violations at disconnected installation 200.

In some embodiments, the update .base file received at disconnected installation 200 includes logical clock information for determining a total ordering of change records in an update .base file and database 222 and for detecting potential causality violations at disconnected installation 200.

Generating Interim and Final Results of the Disconnected Investigation

At step 404 of FIG. 4, interim or final results of the disconnected investigation are generated at disconnected installation 200 in the form of a .dsco file. In some embodiments, generating results of the disconnected investigation includes the remote analyst interfacing with generate .dsco file logic 214 of investigation application logic 210 through front-end logic 205 to export change records from database 222 to a .dsco file created and stored on a filesystem accessible to the computing device hosting the stand-alone investigation application. For example, creating and storing the .dsco file may be caused by the remote analyst invoking an "Export Data" feature of the stand-alone investigation application.

In some embodiments, the change records from database 222 exported to the .dsco file correspond to only the latest or most recent changes made at disconnected installation 200 to investigative objects. Thus, the generated .dsco file does not include any change records for objects that have not been updated at disconnected installation 200 or any change records for changes that are superseded by later changes.

Providing Results of the Disconnected Investigation to the Base Installation

At step 405, the .dsco file generated in step 304 is provided to base installation 100. In some embodiments, providing the .dsco file to base installation 100 includes uploading the .dsco file to base installation 100 from disconnected installation 200 over a periodically available network connecting base installation 100 and disconnected installation 200. In another embodiment in which there is no network available between base installation 100 and disconnected installation 200, the .dsco file is stored in a portable device or computer-readable medium such as a flash drive, a Compact Disc (CD), or a Digital Versatile Disc (DVD), and delivered manually to base installation 100.

In some embodiments, steps 404 and 405 are performed periodically to keep shared data repository 126 at base installation 100 up-to-date with the respect to results of the disconnected investigation being conducted at disconnected installation 200.

Loading and Publishing Results of the Disconnected Investigation

At steps 306 and 307, the .dsco file provided by disconnected installation 200 is loaded at base installation 100 thereby integrating the change records stored therein into database 122. In some embodiments, a user at base installation 100 has the option of either (a) loading and unconditionally publishing the change records stored in the .dsco file to shared data repository 126 or (b) loading and selectively publishing the change records stored in the .dsco file to shared data repository 126. When selectively publishing, the user can specify criteria to investigation application 110 through front-end logic 105 to select some change records stored in the .dsco file for publishing to the shared data repository 126 while discarding other change records. Non-limiting examples of such criteria include 'created by' criterion for selecting change records created by a specific remote analyst, 'created after' criterion for selecting change records that were created after a specific date, 'created before' criterion for selecting change records that were created before a specific date, 'modified after' criterion for selecting change records that were modified after a specific date, and 'modified before' criterion for selecting change records that were modified before a specific date.

As with change records received by a disconnected installation 200 in an update .base file, change records received by a base installation 100 in a .dsco file can conflict with other changes. In some embodiments, load .dsco file logic 112 of investigation application 110 includes logic for determining a total ordering of change records in shared data repository 126 and change records in a .dsco file that are to be published to shared data repository 126 and logic for detecting potential causality violations at base installation 100.

In some embodiments, a .dsco file received from a disconnected installation 200 by a base installation 100 includes an indication of the last change set received from base installation 100 to be incorporated into database 222. In response, investigation application logic 110 at base installation 100 creates and stores a record for the disconnected investigation in database 122 that identifies this last change set acknowledged by the corresponding disconnected installation 200. As explained in greater detail elsewhere in this document, update .base file logic 112 of investigation application logic 110 uses information stored in this record when determining which change records stored in shared data repository 126 to include in an update change set for the disconnected investigation.

Random Database Identifiers for Disconnected Installations

In some embodiments, to aide in controlling access to information stored in database 122, database identifiers are encrypted using a secret encryption key that is private to base installation 100. This effectively generates pseudo-random database identifiers for database data making it virtually impossible to acquire information illicitly by comparing two identifiers. For example, if identifiers were allocated sequentially instead, and two objects had identifiers that differed by just one, then a malicious user or software could discover that the two objects came from the same data source, which would be an information leak.

According to some embodiments, a certain quantity of random identifiers is sent to disconnected installation 200 in the initial .base file generated for the disconnected investigation. Thereafter, disconnected installation 200 consumes random identifiers when making changes to data in database 222. Base installation 100 calculates the number of available random identifiers remaining at disconnected installation 200 based upon the contents of the .dsco files received from the disconnected installation. When the number of available random identifiers at disconnected installation 200 drops below a certain threshold, base installation 100 automatically includes an additional quantity in the next update .base file generated for that disconnected installation.

If a remote analyst makes many changes to database 222, but does not also provide .dsco files to base installation 100 often enough, the disconnected installation 100 could run low of available random identifiers. In some embodiments, investigation application logic 210 warns the remote analyst through front-end logic 205 informing the remote analyst of the problem, and initiating the .dsco generation process. If the remote analyst successfully creates a .dsco file and provides it to base installation 100, an additional supply of random identifiers is provided automatically to the disconnected installation in the next .base file.

Base Installation User Interfaces

FIGS. 10-15 are screen shots of various web pages served by one or more web servers at base installation 100 to either a base web user 103 at base installation 100 or a remote analyst 201 at a disconnected installation 200 according to some embodiments of the invention. In some embodiments, web pages 1000, 1100, 1200, 1300, 1400, and 1500 are provided from one or more web servers at base installation 100 to a remote analyst 201 at a disconnected installation 200 over a periodically available network connecting base installation 100 and disconnected installation 200.

Figure 10:
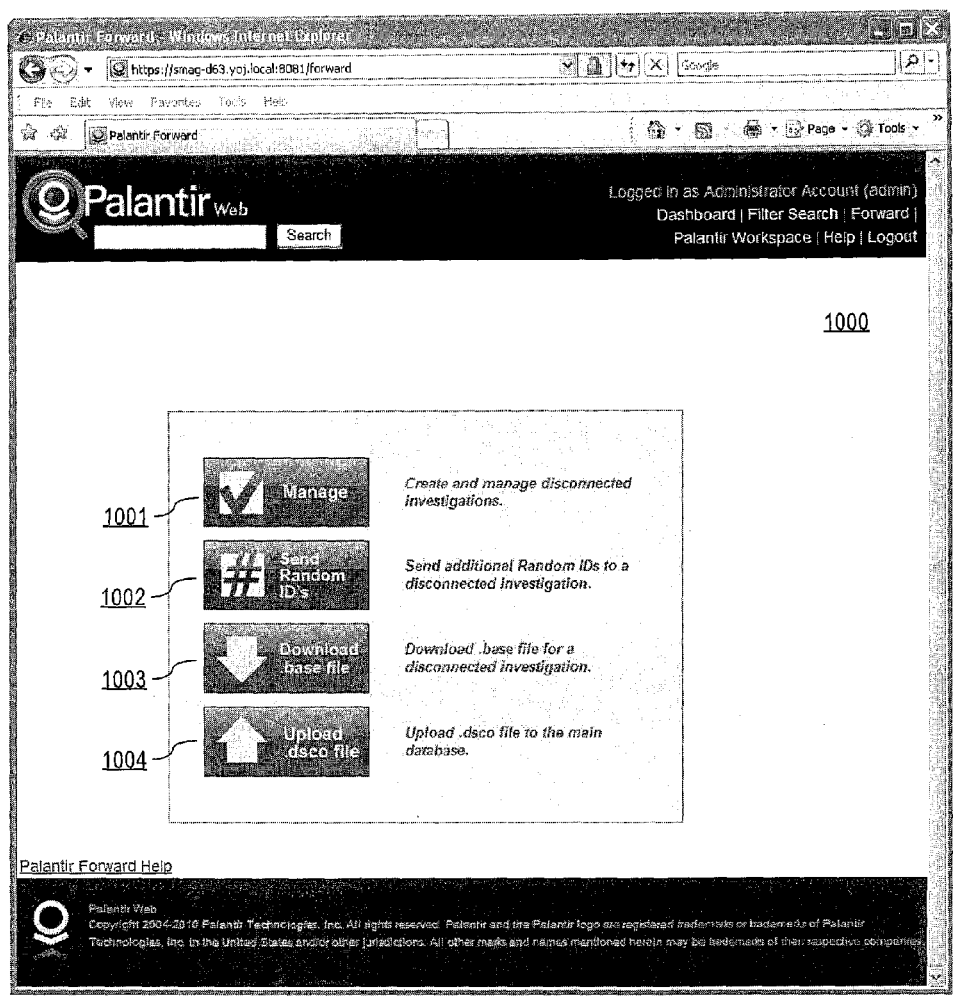
FIGS. 10-15 are screen shots of interactive web pages served by one or more web servers at a base installation to either a base web user at the base installation or a remote analyst at a disconnected installation according to some embodiments of the invention.

FIG. 10 is a screen shot of a web page 1000 provided by investigation application logic 110 through front-end logic 105 according to some embodiments of the invention. Web page 1000 includes Manage button 1001, Send Random ID's button 1002, Download .base file button 1003, and Upload .dsco file button 104. Using the manage button 1001 opens a new web page for creating a new disconnected investigation or updating an existing disconnected investigation. Using the Send Random ID's button 1002 opens a new web page for sending additional random identifiers for a particular disconnected investigation to a corresponding disconnected installation. Using the Download .base file button 1003 opens a new web page for generating and downloading a .base file for a disconnected investigation. Using the Upload .dsco file button 104 opens a new web page for uploading a .dsco file to database 122 at base installation 100.

Figure 11:
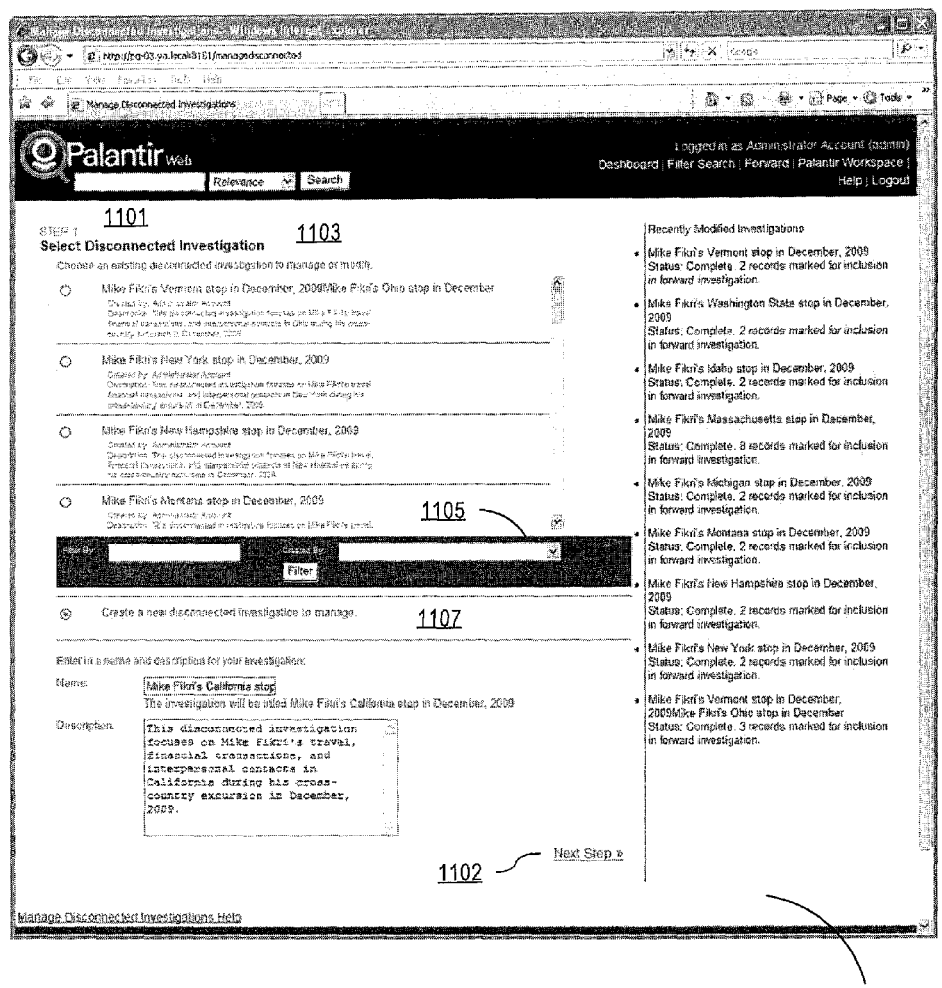

FIG. 11 is a screen shot of a web page 1100 provided by investigation application logic 110 through front-end logic 105 in response to a user using Manage button 1004 of web page 1000 according to some embodiments of the invention. Web page 1100 includes Step 1 Panel 1101 that includes a select disconnected investigation panel 1103 for choosing an existing disconnected investigation to change by selecting its corresponding radio button, filter panel 1105 for finding and selecting an existing disconnected investigation to change, and new disconnected investigation panel 1107 to begin creating a new disconnected investigation by entering its name and a short description of the new investigation. Web page 1100 also includes next step link 1102 for proceeding to the next step in creating or updating a disconnected investigation.

Figure 12:
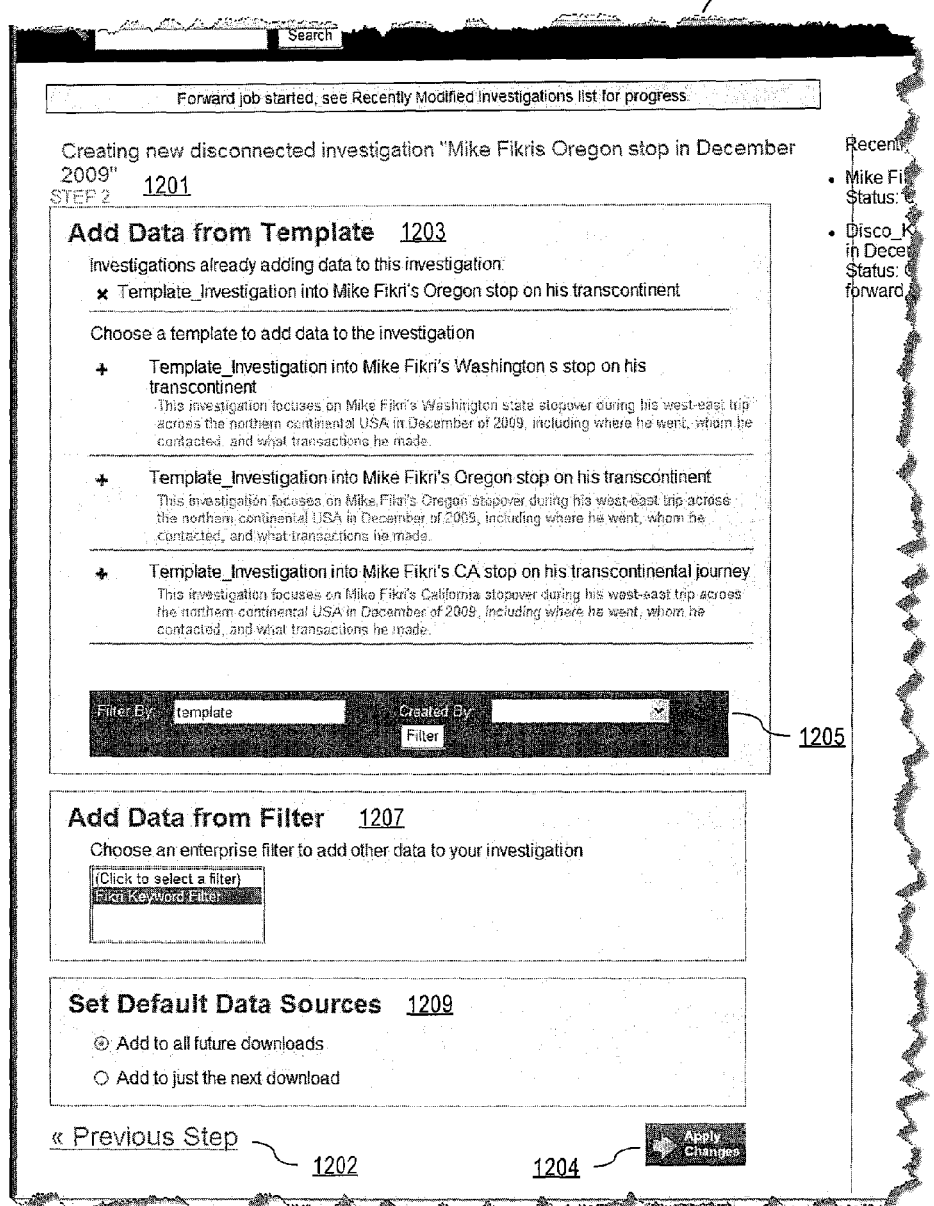

FIG. 12 is a screen shot of a web page 1200 provided by investigation application logic 110 through front-end logic 105 in response to a user using next step link 1102 on web page 1100 according to some embodiments of the invention. Web page 1200 includes Step 2 Panel 1201 that includes an add data from template panel 1203, a filter panel 1205, an add data from filter panel 1207, and set default data sources panel 1209. Web page 1202 also includes a previous step link 1202 for returning to Step 1 Panel 1101 and an apply changes button 1204 for applying changes made to an existing disconnected investigation or for creating a new investigation that was specified. With the add data from template panel 1203, a user can choose existing investigations to use a source of data in shared data repository 126 for a disconnected investigation by clicking with a pointing device the corresponding plus signs (+) next to the investigation names, or remove base investigations added previously by clicking the corresponding Xs. In some embodiments, a template is an investigation curated by an analyst at a base installation. The template can be used as a "folder" for objects to add to a disconnected investigation and to complement filters. For example, if in addition to every object satisfying certain filter criteria, it was desired to include objects A, B, and C in a disconnected investigation, those objects could be added to a template investigation and the template investigation added to the disconnected investigation using the add data from template panel 1203. Filter panel 1205 provides controls for filtering existing investigations 124 stored in database 122 to use as a source of data in shared data repository 126 for a disconnected investigation to be created or changed. Add data from filter panel 1207 provides controls for optionally choosing one or more canned filters to use as source of data in shared data repository 126 for a disconnected investigation. Set default data sources panel 1209 provides controls for indicating whether to use the chosen sources of data in shared data repository 126 only for the next .base file that is generated for the disconnected investigation, or for all future .base files generated for the disconnected investigation.

Figure 13:
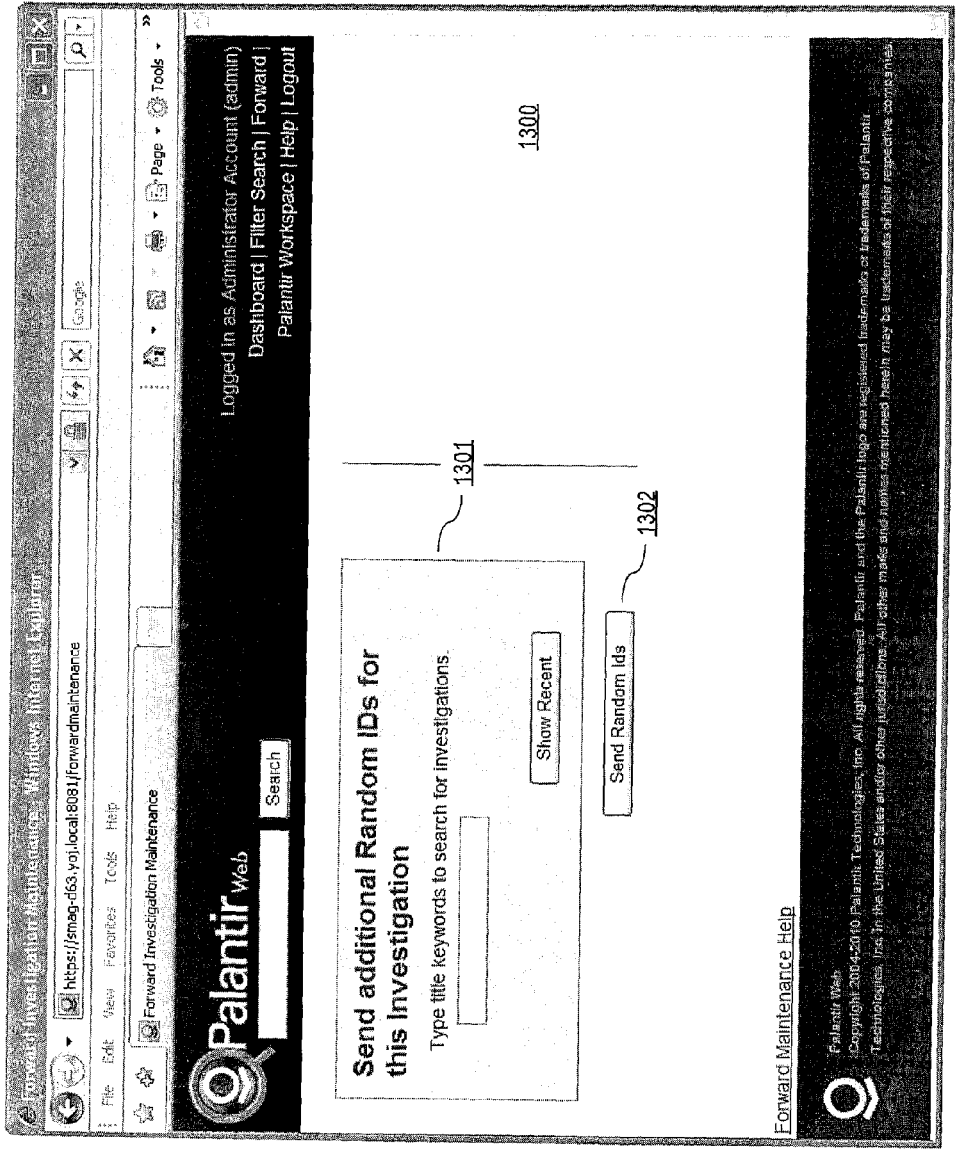

FIG. 13 is a screen shot of a web page 1300 provided by investigation application logic 110 through front-end logic 105 in response to a user using Send Random ID's button 1002 on web page 1000 according to some embodiments of the invention. Web page 1300 includes send additional random IDs for this investigation panel 1301 for selecting the disconnected investigation to send additional random IDs to and send random Ids button 1302 for including additional random IDs in the next .base file generated for the selected disconnected investigation.

Figure 14:
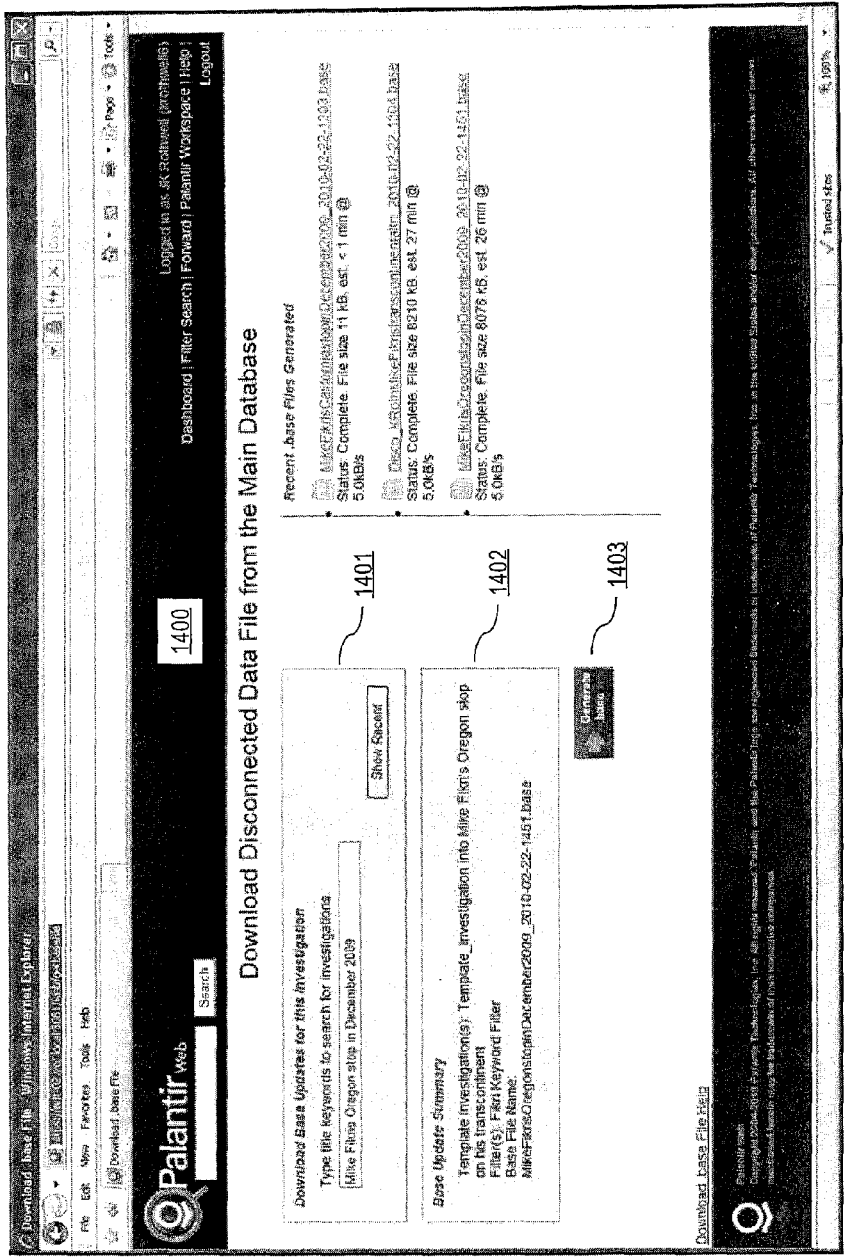

FIG. 14 is a screen shot of a web page 1400 provided by investigation application 110 through front-end logic 105 in response to a user using Download .base file button 1003 on web page 1000 according to some embodiments of the invention. Web page 1400 includes download base updates for this investigation panel 1401 for selecting the disconnected investigation for which to generate and download a .base file containing the investigation, or an update to the disconnected investigation. Web page 1400 also includes base update summary panel 1402 for viewing information about the sources of published data used to add data to the .base file, and the .base file name. Web page 1400 also includes generate .base button 1403 for generating and downloading a .base file for the selected disconnected investigation. In some embodiments, a downloaded .base file is stored in a portable device or computer-readable medium such as a flash drive, a Compact Disc (CD), or a Digital Versatile Disc (DVD) for manual delivery to disconnected installation 200. Web page 1400 also includes recent .base files generated panel 1404 for viewing a list of recently generated .base files, and optionally downloading a .base file by clicking with a pointing device on the corresponding hyperlink. With web page 1400, generating an update to an existing disconnected investigation is a matter of selecting the existing disconnected investigation using panel 1401 and downloading an update .base file for the disconnected investigation by using the generate .base button 1403.

Figure 15:
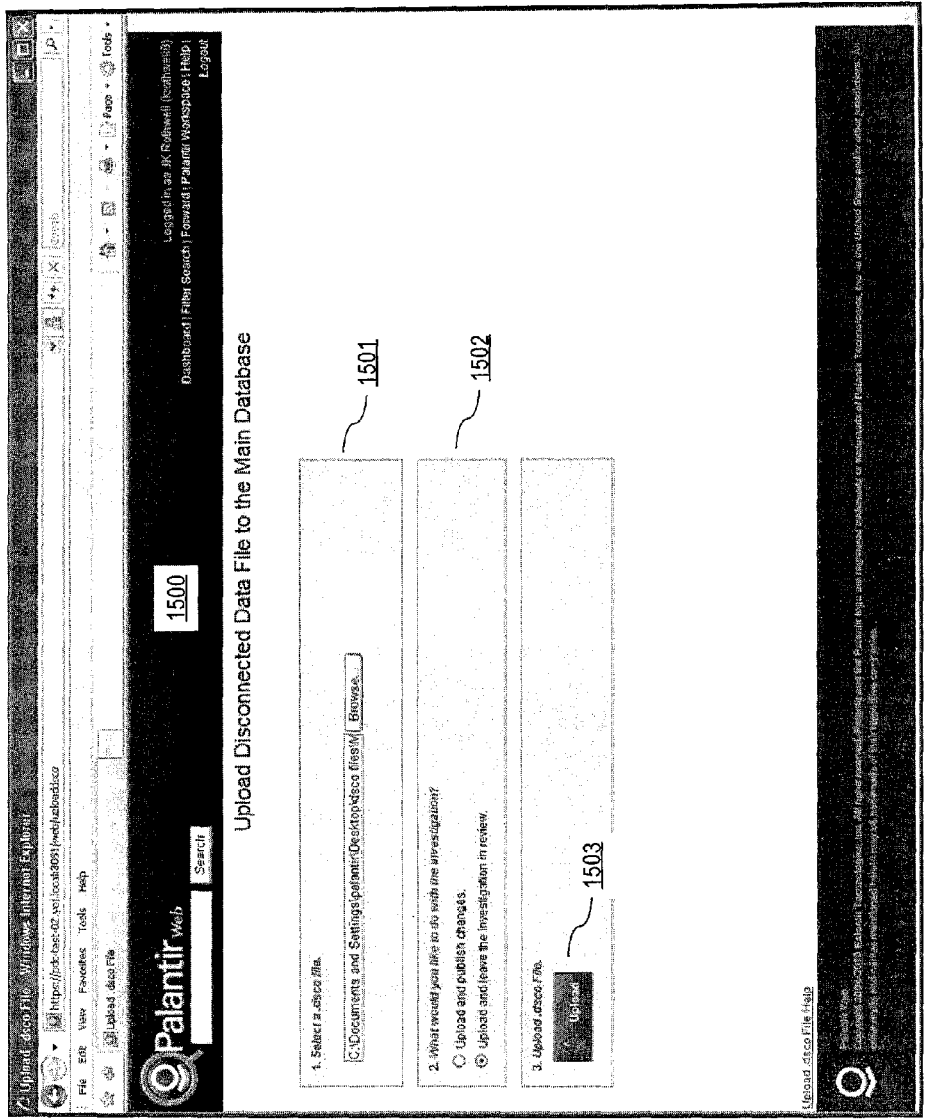

FIG. 15 is a screen shot of a web page 1500 provided by investigation application 110 through front-end logic 105 in response to a user using Upload .dsco file button 1004 on web page 1000 according to some embodiments of the invention. Web page 1500 includes select a .dsco file panel 1501 for selecting the .dsco file from a locally available filesystem to upload. Question panel 1502 includes controls for choosing whether to upload the investigative data from the selected .dsco file and publish all the investigative data immediately and unconditionally to shared data repository 126, or upload the investigative data only and set the disconnected investigation status to "Awaiting Review", requiring a base user 101 or a base web user 103 to review the data and publish it selectively to shared data repository 126. Web page 1500 also includes upload .dsco file button 1503 for uploading the .dsco file that is selected in panel 1501 and for processing the selected .dsco file according to the publishing option selected in panel 1502. In some embodiments, a .dsco file is made available for upload from a portable device or computer-readable medium such as a flash drive, a Compact Disc (CD), or a Digital Versatile Disc (DVD) provided to base installation 100 from disconnected installation 200.

Implementation Mechanisms

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
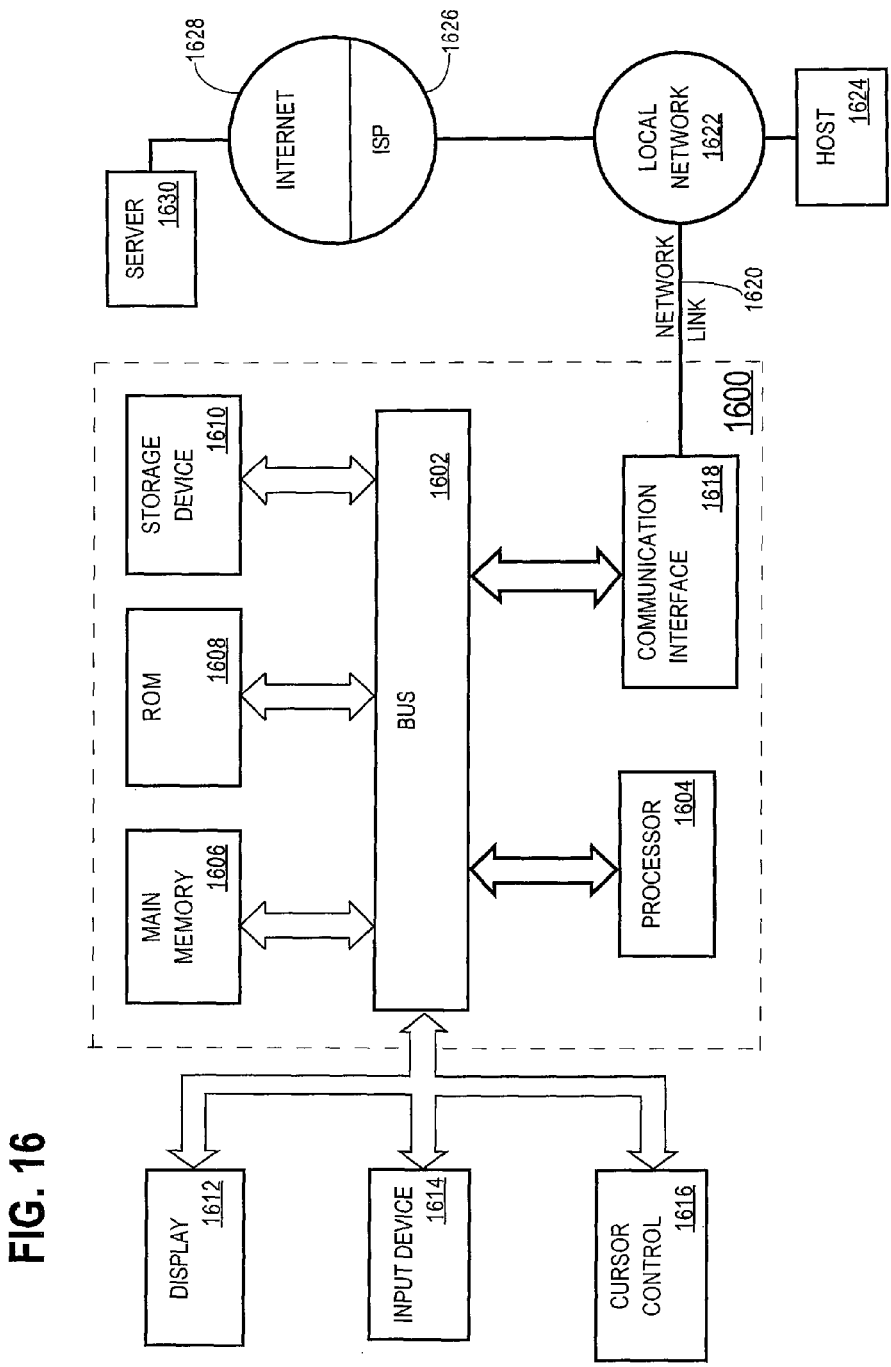
FIG. 16 illustrates a computer system with which some embodiments may be implemented.

For example, FIG. 16 is a block diagram that illustrates a computer system 1600 upon which some embodiments of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to some embodiments, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "non-transitory media" as used herein refers to any storage media that stores data and/or instructions that cause a machine to operation in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for managing a disconnected investigation, the method comprising:
   a base installation remote and disconnected from a disconnected installation at which the disconnected investigation is conducted, the base installation comprising:
   one or more server computers;
   a database hosted in a digital storage device on the one or more server computers, the database comprising a shared data repository and an investigation repository; and
   a revisioning database hosted in the digital storage device on the one or more server computers;
   at a first time:
     the one or more server computers identifying, in the shared data repository, an initial set of data objects to be the subject of the disconnected investigation;
     the one or more server computers identifying, in the revisioning database, an initial set of change records corresponding to the initial set of data objects;

the one or more server computers storing the initial set of change records and the initial set of data objects in one or more initial base files in the investigation repository;
at a second time that is after the first time:
the one or more server computers identifying, in the shared data repository, an update set of data objects to be the subject of the disconnected investigation, the update set of data objects comprising at least one data object not in the initial set of data objects and at least one data object in the initial set of data objects;
the one or more server computers identifying, in the revisioning database, an update set of change records corresponding to the update set of data objects, the update set of change records comprising at least one change record pertaining to a change to a data object in the initial set of data objects made in the shared data repository after the first time but before the second time;
the one or more server computers storing the update set of change records and the update set of data objects in one or more update base files in the investigation repository.

2. The method of claim 1, further comprising:
at the first time:
the one or more server computers obtaining investigation subject criteria in the form of a query and/or a filter;
the one or more server computers applying the investigation subject criteria to the shared data repository to identify the initial set of data objects;
at the second time:
the one or more server computers applying the investigation subject criteria to the shared data repository to identify the update set of data objects.

3. The method of claim 1, wherein the update set of change records do not include any change records pertaining to changes to the initial set of data objects made in the shared data repository before the first time.

4. The method of claim 1, further comprising:
the one or more server computers maintaining, in the database, an investigation-change set relation that identifies what change sets have been generated for which disconnected investigations and when those change sets were generated by associating disconnected investigation identifiers, change set identifiers, and logical clock values.

5. The method of claim 1, further comprising:
the one or more server computers maintaining, in the database, a change set-data object relation that identifies which data objects were selected for inclusion in which change sets by associating change set identifiers and data object identifiers.

6. The method of claim 1, wherein the one or more initial base files and the one or more update base files are physically transported to the remote disconnected installation at which the disconnected investigation is conducted on a portable data storage device.

7. The method of claim 1, further comprising:
at a third time that is after the first time but before the second time:
the one or more server computers obtaining one or more disconnected investigation files comprising one or more change records reflecting changes made to one or more of the initial set of data objects in a database at the remote disconnected installation as part of the disconnected investigation; and the one or more server computers updating the data objects in the shared data repository based on at least some of the change records in the one or more disconnected investigation files.

8. The method of claim 1, wherein the one or more initial base files comprise a plurality of private key encrypted database data identifiers for assigning to data object changes made in a database at the remote disconnected installation as part of the disconnected investigation.

9. A system for managing a disconnected investigation comprising:
a base installation comprising:
one or more server computers;
a database hosted in a digital storage device on the one or more server computers, the database comprising a shared data repository and an investigation repository; and
a revisioning database hosted in the digital storage device on the one or more server computers;
a disconnected installation remote and disconnected from the base installation comprising:
a computing device; and
a database hosted in a digital storage device on the computing device;
wherein the one or more server computers of the base installation are configured to perform at a first time:
identifying, in the shared data repository, an initial set of data objects to be the subject of the disconnected investigation,
identifying, in the revisioning database, an initial set of change records corresponding to the initial set of data objects, and
storing the initial set of change records and the initial set of data objects in one or more initial base files in the investigation repository;
wherein the computing device of the disconnected installation is configured to perform, at a second time that is after the first time, incorporating the initial set of change records from the one or more initial base files into the database at the disconnected installation;
wherein the computing device of the disconnected installation is configured to perform, at a third time that is after the second time, making one or more changes to one or more of the initial set of data objects in the database at the disconnected installation;
wherein the computing device of the disconnected installation is configured to perform at a fourth time that is after the third time:
identifying, in the database at the disconnected installation, a first update set of change records reflecting the one or more changes to one or more of the initial set of data objects made in the database at the disconnected installation at the third time, and
storing the first update set of change records in one or more disconnected investigation files;
wherein the one or more server computers of the base installation are configured to perform at a fifth time that is after the fourth time:
obtaining the one or more disconnected investigation files, and
updating the data objects in the shared data repository based on at least some of the first update set of change records in the one or more disconnected investigation files;
wherein the one or more server computers of the base installation are configured to perform at a sixth time that is after the fifth time:

identifying, in the shared data repository, an update set of data objects to be the subject of the disconnected investigation, identifying, in the revisioning database, a second update set of change records for the update set of data objects, and storing the second update set of change records and the update set of data objects in one or more update base files in the investigation repository.

10. The system of claim 9, wherein the update set of data objects comprises at least one data object not in the initial set of data objects and at least one data object in the initial set of data objects.

11. The system of claim 9, wherein the second update set of change records comprises at least one change record pertaining to a change to a data object in the initial set of data objects made in the shared data repository after the first time but before the sixth time.

12. The system of claim 9, wherein the one or more initial base files comprise a plurality of private key encrypted database data identifiers for assigning to data object changes made at the database at the disconnected installation, the plurality of private key encrypted database data identifiers generated by the one or more servers of the base installation at the first time.

13. The system of claim 9, wherein the one or more update base files comprise a plurality of private key encrypted database data identifiers for assigning to data object changes made at the database at the disconnected installation, the plurality of private key encrypted database data identifiers generated by the base investigation application logic at the fifth time.

14. A method for managing a disconnected investigation, the method comprising:
a disconnected installation remote and disconnected from a base installation, the disconnected installation comprising:
a computing device; and
a database hosted in a digital storage device on the computing device;
at a first time, the computing device incorporating into the database, from one or more initial base files generated at the base installation, an initial set of change records and an initial set of data objects that are the subject of the disconnected investigation;
at a second time that is after the first time, the computing device making in the database one or more changes to one or more of the initial set of data objects;
at a third time that is after the second time:
the computing device identifying, in the database, a first update set of change records reflecting the one or more changes to one or more of the initial set of data objects made in the database at the second time, and
the computing device storing the first update set of change records in one or more disconnected investigation files.

15. The method of claim 14, further comprising:
at a fourth time that is after the third time, the computing device incorporating, from one or more update base files into the, a second update set of change records and an update set of data objects that are the subject of the disconnected investigation, the one or more update base files generated at the base installation.

16. The method of claim 15, wherein the update set of data object comprises at least one data object not in the initial set of data objects and at least one data object in the initial set of data objects.

17. The method of claim 15, wherein the second update set of change records comprises at least one change record pertaining to a change to a data object in the initial set of data objects made in a shared data repository in a database hosted in a digital storage device on one or more server computers at the base installation.

18. The method of claim 14, wherein the one or more initial base files comprise a plurality of private key encrypted database data identifiers for assigning to data object changes made in the database at the disconnected installation, the plurality of private key encrypted database data identifiers generated by one or more server computers at the base installation.

19. The method of claim 18, wherein at least one of the first update set of change records comprises at least one of the plurality of private key encrypted database data identifiers.

20. The method of claim 14, wherein the one or more disconnected investigation files are capable of being physically transported to the remote base installation on a portable non-transitory computer-readable medium.

* * * * *